US011268868B2

(12) United States Patent
Ikeuchi

(10) Patent No.: US 11,268,868 B2
(45) Date of Patent: Mar. 8, 2022

(54) DRIVING FORCE APPLIED POSITION ESTIMATION SYSTEM AND DRIVING FORCE APPLIED POSITION ESTIMATION METHOD

(71) Applicant: Honda Motor Co., Ltd., Tokyo (JP)

(72) Inventor: Yasushi Ikeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/074,580

(22) Filed: Oct. 19, 2020

(65) Prior Publication Data

US 2021/0123825 A1 Apr. 29, 2021

(30) Foreign Application Priority Data

Oct. 28, 2019 (JP) ............................ JP2019-195435

(51) Int. Cl.

*G01L 5/13* (2006.01)
*G01L 1/22* (2006.01)
*A61G 5/10* (2006.01)
*G01B 7/30* (2006.01)

(52) U.S. Cl.

CPC .................. *G01L 5/13* (2013.01); *A61G 5/10* (2013.01); *G01B 7/30* (2013.01); *G01L 1/22* (2013.01); *A61G 2203/32* (2013.01)

(58) Field of Classification Search

None

See application file for complete search history.

(56) References Cited

U.S. PATENT DOCUMENTS

2016/0059928 A1* 3/2016 Yeh ........................ B60L 50/52
701/22

FOREIGN PATENT DOCUMENTS

JP 2013192875 9/2013

* cited by examiner

*Primary Examiner* — Lisa M Caputo
*Assistant Examiner* — Nigel H Plumb
(74) *Attorney, Agent, or Firm* — JCIPRNET

(57) ABSTRACT

The disclosure provides a driving force applied position estimation system that can accurately estimate an applied position of a driving force from an occupant. A measurement system includes a six-axis force sensor provided in a wheelchair, a rotation angle recognition part which recognizes a rotation angle of the six-axis force sensor, and a COP estimation part which estimates a COP that is the applied position of the driving force from the occupant to the wheelchair. The COP estimation part estimates the COP based on a translational force and a moment detected by the six-axis force sensor and based on the rotation angle recognized by the rotation angle recognition part to improve estimation accuracy of the COP estimation part and measurement accuracy of the measurement system.

20 Claims, 16 Drawing Sheets

S1

1

2

DRIVING FORCE APPLIED POSITION ESTIMATION SYSTEM AND DRIVING FORCE APPLIED POSITION ESTIMATION METHOD

CROSS-REFERENCE TO RELATED APPLICATION

This application claims the priority benefit of Japan application serial no. 2019-195435, filed on Oct. 28, 2019. The entirety of the above-mentioned patent application is hereby incorporated by reference herein and made a part of this specification.

BACKGROUND

Technical Field

The disclosure relates to a driving force applied position estimation system and a driving force applied position estimation method for estimating an applied position of a driving force from an occupant to a wheelchair.

Description of Related Art

Conventionally, in order to measure the driving force (force applied to the hand rim during operation) applied to the wheelchair by the occupant via the hand rim, a wheelchair having a strain gauge disposed on each of support members supporting the hand rim on the wheel surface is known (for example, see Patent Document 1).

RELATED ART

Patent Document

[Patent Document 1] Japanese Laid-open No. 2013-192875

However, when a measurement system is configured by using the conventional wheelchair described in Patent Document 1, since the strain gauge is used as a detector in the wheelchair, although the magnitude of the force applied from the occupant to the hand rim can be measured, the applied position of the force cannot be measured in detail.

Then, for example, in a wheelchair for racing used in a track race, a marathon and the like, there is a demand for accurately capturing the applied position of the driving force from the occupant to the hand rim for the training of the occupant.

The disclosure has been made in view of the above points, and the disclosure provides a driving force applied position estimation system and a driving force applied position estimation method that can accurately estimate an applied position of a driving force from an occupant.

SUMMARY

A driving force applied position estimation system of the disclosure includes a cage for an occupant to sit, a driving wheel rotatably attached to the cage, and a hand rim provided on the driving wheel. The driving force applied position estimation system includes:

a multi-axis force detection part which is provided between the driving wheel and the hand rim and which detects a translational force and a moment related to application of a driving force from the hand rim side;

a posture recognition part which recognizes a posture of the multi-axis force detection part that changes according to rotation of the driving wheel and the hand rim; and an applied position estimation part which estimates an applied position of the driving force from the occupant to the hand rim, wherein the applied position estimation part estimates the applied position based on the translational force and the moment detected by the multi-axis force detection part and based on the posture recognized by the posture recognition part.

Further, a driving force applied position estimation method of the disclosure includes a cage for an occupant to sit, a driving wheel rotatably attached to the cage, and a hand rim provided on the driving wheel for estimating an applied position of a driving force from the occupant to the hand rim. The driving force applied position estimation method includes:

detecting, by a multi-axis force detection part which is provided between the driving wheel and the hand rim and whose posture changes according to rotation of the driving wheel and the hand rim, a translational force and a moment related to application of the driving force from the hand rim side;

recognizing, by a posture recognition part, the posture of the multi-axis force detection part; and estimating, by an applied position estimation part, the applied position based on the translational force and the moment detected by the multi-axis force detection part and based on the posture recognized by the posture recognition part.

DESCRIPTION OF THE EMBODIMENTS

Figure 1:
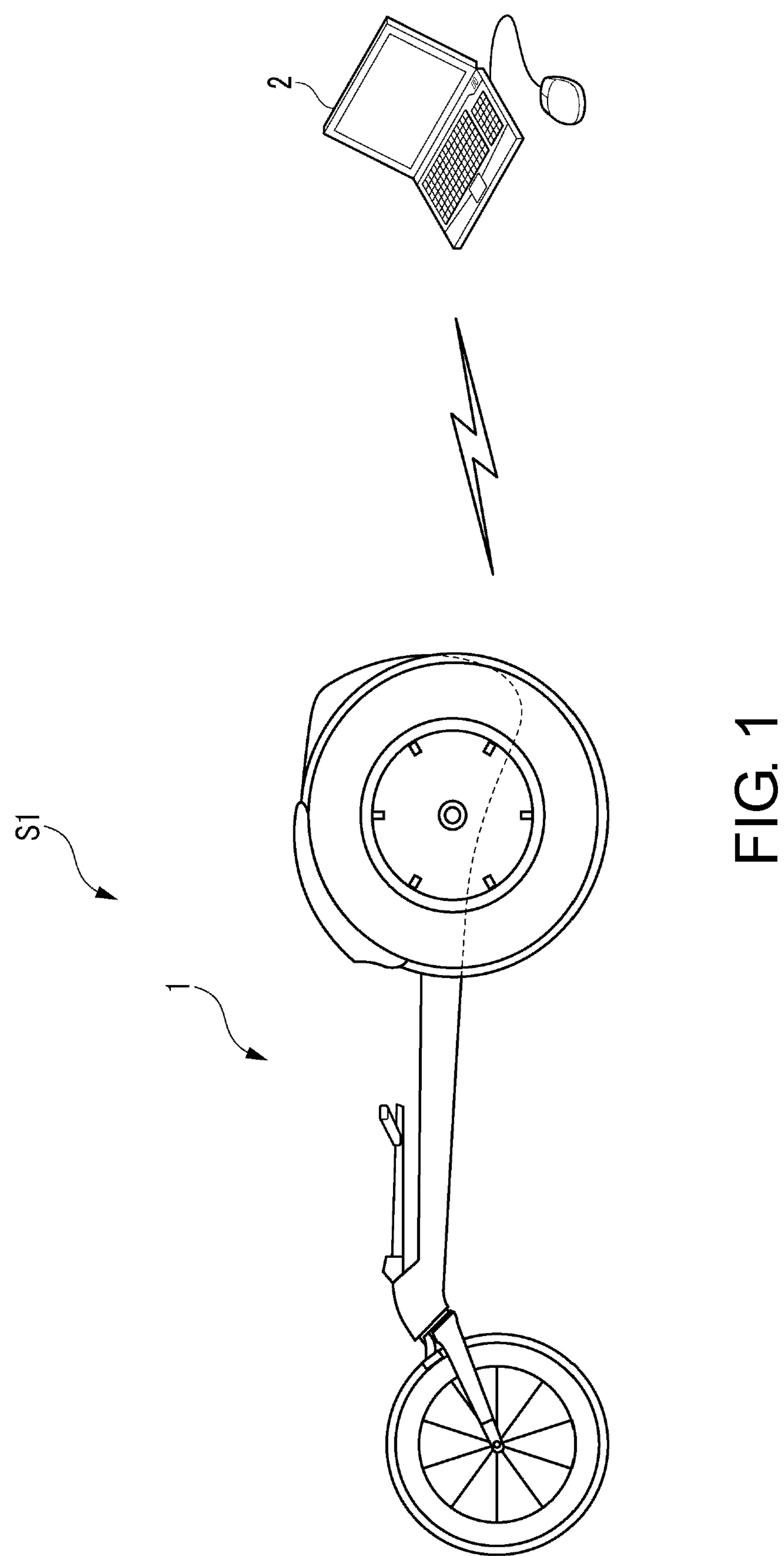
FIG. 1 is an illustration view showing a schematic configuration of a measurement system according to a first embodiment.

In the drying force applied position estimation system of the disclosure, when measuring the driving force applied to the wheelchair from the occupant, the applied position is estimated by using the translational force and the moment that are commonly measured. These parameters are common parameters, and may be detected relatively accurately without using any special equipment. Further, the posture of the multi-axis force detection part may be detected relatively easily and accurately based on the design values of the wheelchair and the like.

Therefore, by adopting the parameters of the translational force and the moment detected by the six-axis force detection, and thus the posture of the six-axis force sensor, the driving force applied position estimation system may accurately estimate the applied position of the driving force from the occupant to the hand rim without using special equipment.

Further, in the driving force applied position estimation system of the disclosure, it is preferable that the multi-axis force detection part rotates integrally with the driving wheel and the hand rim, the posture recognition part is a rotation angle recognition part which recognizes a rotation angle of the multi-axis force detection part around a rotation axis of the driving wheel, and the applied position estimation part estimates the applied position based on the translational force and the moment detected by the multi-axis force detection part and based on the rotation angle recognized by the rotation angle recognition part.

When the driving force applied to the wheelchair by the occupant is measured, the rotation angle is a parameter commonly used and may be detected relatively easily and accurately. Therefore, by adopting the rotation angle as the parameter indicating the posture of the multi-axis force detection part in this way, it is possible to more accurately estimate the applied position of the driving force from the occupant to the hand rim.

Further, in the driving force applied position estimation system of the disclosure, when the rotation angle of the multi-axis force detection part is adopted as the posture of the multi-axis force detection part, it is preferable to further include:

an acceleration sensor which rotates integrally with the driving wheel, the hand rim, and the multi-axis force detection part; and an angular velocity sensor which recognizes an angular velocity of the acceleration sensor around an axis of the driving wheel, wherein the multi-axis force detection part is a six-axis force sensor, and the rotation angle recognition part recognizes the rotation angle based on a detection value of the acceleration sensor and a detection value of the angular velocity sensor.

The six-axis force sensor, the acceleration sensor and the angular velocity sensor are commonly used sensors, and there are light-weight and small-sized ones. Therefore, these sensors may be mounted on the wheelchair itself. Further, since the detection values by the six-axis force sensor, the acceleration sensor and the angular velocity sensor are direct numerical values, it is not necessary to perform complicated processes such as image processing in order to perform the process for estimating the applied position. As a result, a large processing device is not required.

Therefore, according to this configuration, the system may be configured simply by a wheelchair equipped with these sensors and a small information terminal. As a result, for example, it is possible to perform measurement while the wheelchair is actually run, regardless of the location.

Further, in the driving force applied position estimation system of the disclosure, when the rotation angle of the multi-axis force detection part is adopted as the posture of the multi-axis force detection part, it is preferable to include:

an acceleration sensor which rotates integrally with the driving wheel, the hand rim, and the multi-axis force detection part; and an angular velocity sensor which recognizes an angular velocity of the acceleration sensor around an axis of the driving wheel, wherein the rotation angle recognition part includes:

an acceleration correction part which corrects the acceleration detected by the acceleration sensor in a radial direction of the driving wheel based on the angular velocity of the acceleration sensor around the axis of the driving wheel;

a gravity direction recognition part which recognizes a gravity direction based on the corrected acceleration; and a recognition processing part which recognizes the rotation angle based on the recognized gravity direction.

When an acceleration sensor is adopted as one of the sensors for recognizing the rotation angle and the acceleration sensor is configured to rotate integrally with the driving wheel, the hand rim and the multi-axis force detection part, the detection value of the acceleration sensor may be influenced by the centrifugal force. As a result, there is a concern that the gravity direction cannot be recognized accurately, and thus the rotation angle of the multi-axis force detection part that is recognized based on the gravity direction cannot be recognized accurately.

Therefore, as described above, when the acceleration of the acceleration sensor in the radial direction of the driving wheel is corrected based on the angular velocity (and thus the centrifugal force component) of the acceleration sensor around the axis of the driving wheel, it is possible to accurately recognize the gravity direction and thus the rotation angle of the multi-axis force detection part that is recognized based on the gravity direction. As a result, it is possible to more accurately estimate the applied position of the driving force from the occupant to the hand rim.

Further, in the driving force applied position estimation system of the disclosure, when the rotation angle of the multi-axis force detection part is adopted as the posture of the multi-axis force detection part, it is preferable to include:

a translational force correction part which corrects the translational force detected by the multi-axis force detection part, wherein when a structure on an input side with respect to a detection position in the multi-axis force detection part is an input side structure, the translational force correction part corrects the translational force detected by the multi-axis force detection part based on a weight of the input side structure and the rotation angle, and the applied position estimation part estimates the applied position based on the translational force corrected by the translational force correction part, the moment detected by the multi-axis force detection part, and the rotation angle.

Further, in the driving force applied position estimation system of the disclosure, when the rotation angle of the multi-axis force detection part is adopted as the posture of the multi-axis force detection part, it is preferable to include:

a moment correction part which corrects the moment detected by the multi-axis force detection part, wherein when a structure on an input side with respect to a detection position in the multi-axis force detection part is an input side structure, the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

Depending on the type of sensor adopted as the multi-axis force detection part, the weight of the input side structure with respect to the sensor may influence the detection values of the translational force and the moment of the sensor. Therefore, as described above, if the detection values from the multi-axis force detection part are corrected based on the weight of the input side structure and the applied position is estimated based on the corrected values, the applied position may be estimated more accurately.

Further, in the driving force applied position estimation system of the disclosure, when the rotation angle of the multi-axis force detection part is adopted as the posture of the multi-axis force detection part, it is preferable that the applied position estimation part generates an evaluation function based on the translational force and the moment detected by the multi-axis force detection part and estimates the applied position based on a result of optimization calculation for the evaluation function and the rotation angle recognized by the rotation angle recognition part.

According to this configuration, the applied position may be estimated by a relatively simple process.

Further, in the driving force applied position estimation system of the disclosure, it is preferable to include a wheelchair having the cage, the driving wheel, and the hand rim.

The driving force applied position estimation system of the disclosure does not necessarily incorporate the wheelchair itself. However, as described above, when the wheelchair itself is incorporated, the measurement may be performed in an environment close to the actual running situation.

First Embodiment

Hereinafter, a measurement system S1 (a driving force applied position estimation system) according to a first embodiment will be described with reference to FIGS. 1 to 16. Further, though the measurement system S1 measures a wheelchair 1 used in a track race, a marathon and the like, a measurement system using the driving force applied position estimation device of the disclosure may measure other wheelchairs in addition to sport wheelchairs.

[Schematic Configuration of the Overall System]

First, a schematic configuration of the measurement system S1 will be described with reference to FIG. 1.

As shown in FIG. 1, the measurement system S1 includes the wheelchair 1 which has sensors, and an information terminal 2 which obtains detection values from the sensors and performs analysis processes based on the obtained detection values.

The detection values of the sensors mounted on the wheelchair 1 are configured to be capable of being transmitted to the information terminal 2 by wireless communication via a transmitter 19 (to be described later). In this way, the measurement may be performed while the wheelchair 1 is actually run. Therefore, in a case where the wheelchair 1 is fixed and measured as in a second embodiment (to be described later), the information from the sensors for the measurement may be configured to be capable of being transmitted to the information terminal 2 by wired communication.

[Schematic Configuration of the Overall Wheelchair]

Next, the configuration of the wheelchair 1 of the measurement system S1 will be described with reference to FIGS. 2 to 5.

Figure 2:
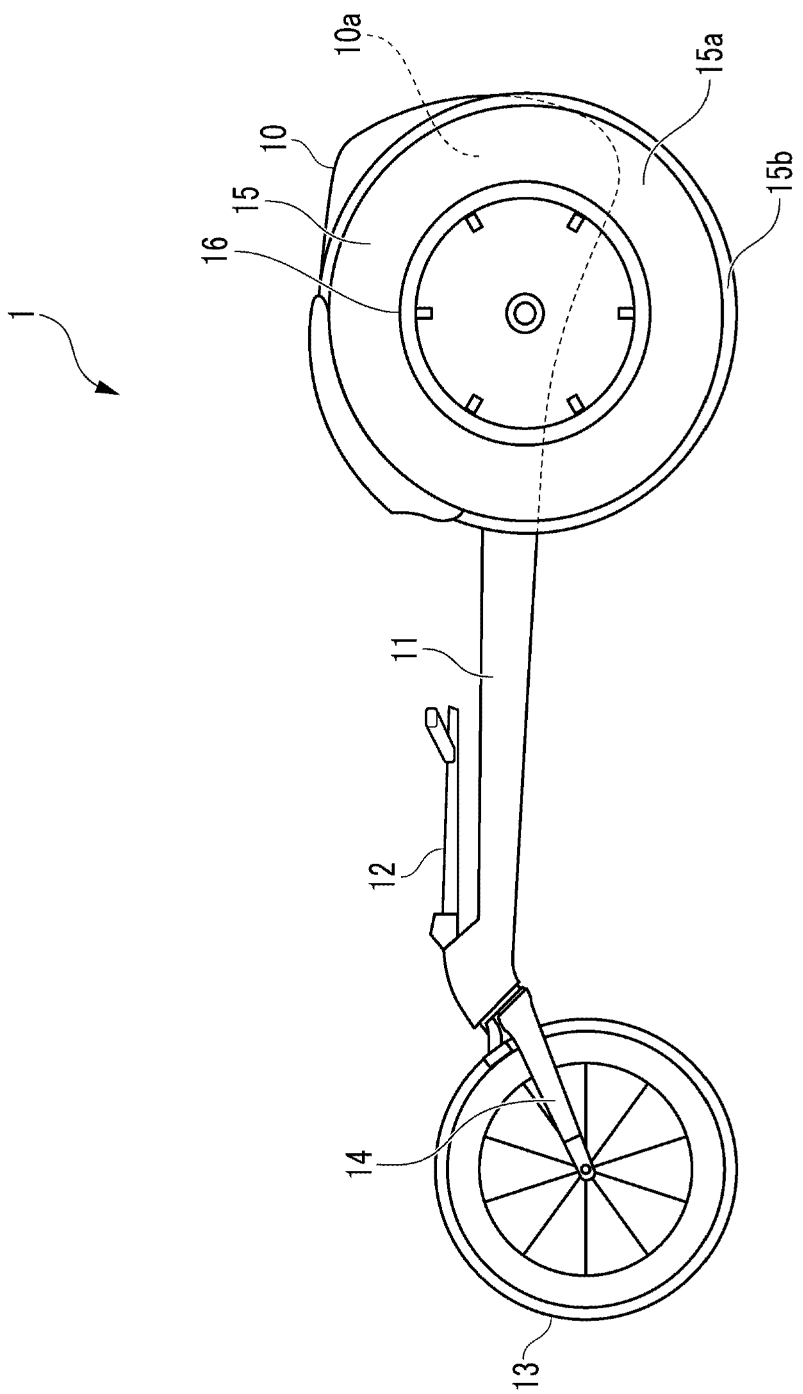
FIG. 2 is a side view of the wheelchair of the measurement system of FIG. 1.
Figure 3:
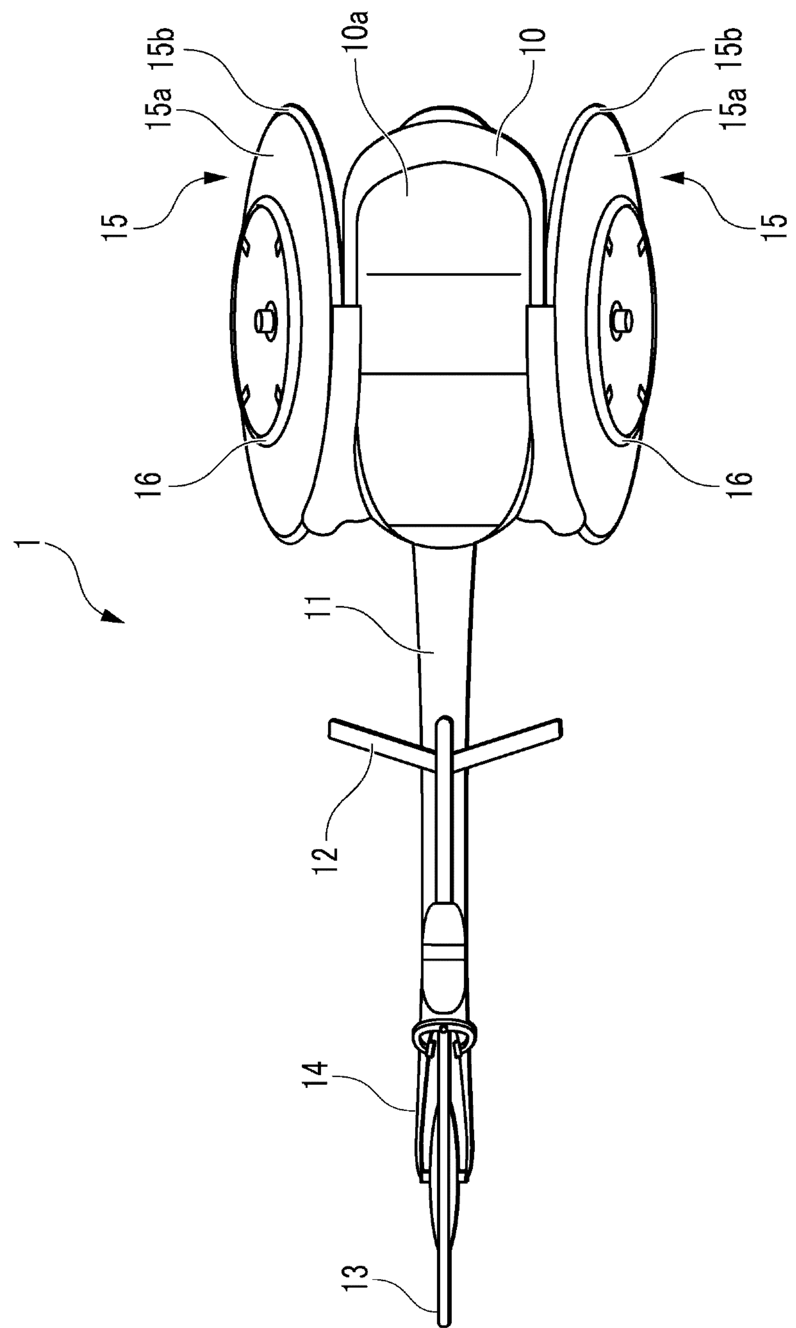
FIG. 3 is a plan view of the wheelchair of the measurement system of FIG. 1.

As shown in FIGS. 2 and 3, the wheelchair 1 includes a cage 10 for an occupant to sit and a vehicle frame 11 extending in front of the cage 10.

The wheelchair 1 further includes a handle 12 for steering which is rotatable with respect to the vehicle frame 11, a front wheel 13 (steering wheel) disposed at the front end of the vehicle frame 11, and a front fork 14 attached to the front end of the vehicle frame 11.

The wheelchair 1 further includes a pair of rear wheels 15 (driving wheels) attached to the left and right of the cage 10 and hand rims 16 attached to the side of the rear wheels 15 opposite to the cage 10.

As shown in FIG. 2, the cage 10 is open in the upper part. Inside the cage 10, a seat 10*a* for a competitor (occupant) to sit is disposed. The occupant gets in from the open part of the cage 10 and sits on the seat 10*a* for sitting.

The front fork 14 is rotatably and pivotally supported on the tip end of the vehicle frame 11 around an axis extending from the upper rear to the lower front. The handle 12 is attached to the rear end of the front fork 14. Further, the front wheel 13 is rotatably held at the front end of the front fork 14.

Therefore, in the wheelchair 1, by operating the handle 12, the direction of the front wheel 13 may be changed via the front fork 14, and the wheelchair 1 may be turned to a desired direction.

The rear wheel 15 has a wheel 15*a* and a tire 15*b* fitted to the wheel 15*a*. The rear wheels 15 are attached to the cage 10 in a state of being inclined toward the center side of the cage 10 as they go upward.

The hand rims 16 are fixed to the rear wheels 15 via six-axis force sensors 17 and outer flanges 15*e* to be described later (see FIG. 5). Therefore, the hand rims 16 rotate integrally with the rear wheels 15. The competitor sitting on the seat 10*a* for sitting transmits the driving force to the rear wheels 15 via the hand rims 16.

[Configuration of Sensor and Vicinity Thereof]

Here, the structure around the connecting part between the cage 10 and the rear wheels 15 of the wheelchair 1 will be described in detail with reference to FIGS. 4 and 5.

Figure 4:
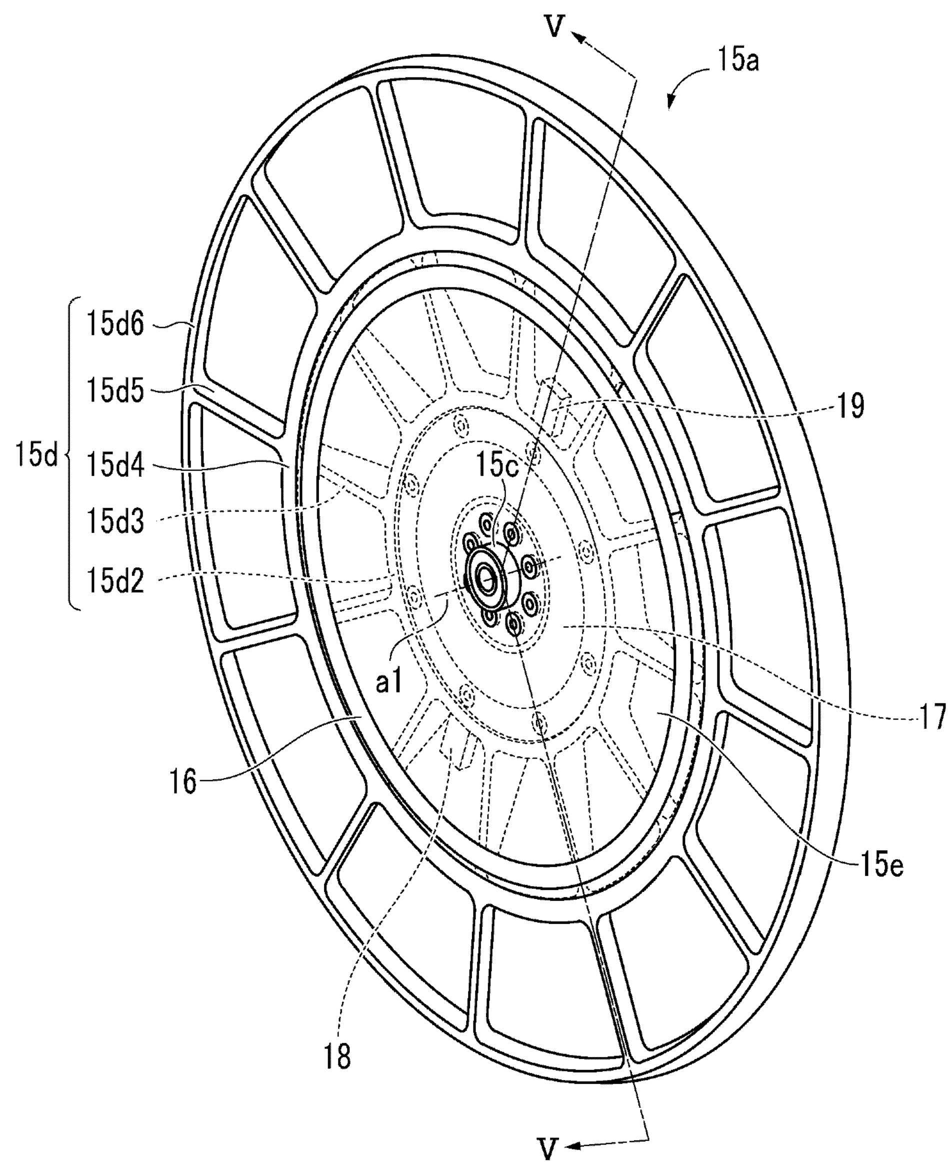
FIG. 4 is a perspective view of the wheel frame of the driving wheel of the wheelchair of FIG. 2.
Figure 5:
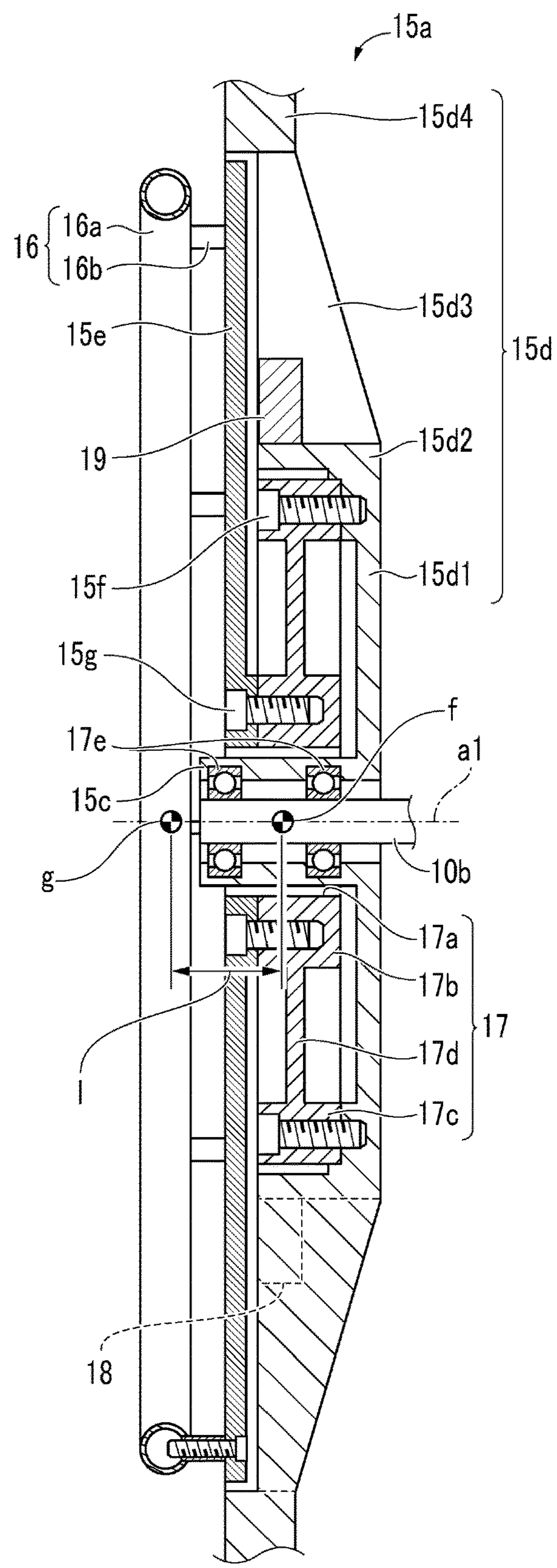
FIG. 5 is a cross-sectional view taken along the line V-V showing an enlarged main part of the wheel frame of FIG. 4.

As shown in FIGS. 4 and 5, the wheel 15*a* of the rear wheel 15 includes a tubular hub 15*c*, an inner flange 15*d* extending in the radial direction from the end of the hub 15*c* on the cage 10 side, and an annular outer flange 15*e* on the side opposite to the cage 10 and covering from the vicinity of the central part of the inner flange 15*d* to the radial-direction central part.

In the wheelchair 1, the annular six-axis force sensor 17 fitted to the hub 15*c*, an internal measurement unit (IMU) sensor 18 attached to the inner flange 15*d*, and the transmitter 19 are disposed inside the rear wheel 15.

As shown in FIGS. 4 and 5, the hub 15*c* is a tubular member. An axle 10*b* extending from the cage 10 of the wheelchair 1 is inserted into the hub 15*c*. Therefore, the hub 15*c* (and thus the entire wheel 15*a* ) is rotatable about the rotation axis of the axle 10*b* (that is, a rotation axis a1 of the rear wheel 15).

The inner flange 15*d* includes, in order from the hub 15*c* side (inner peripheral side), a disk-shaped disk 15*d*1, a tubular first rim 15*d*2, multiple rod-shaped first ribs 15*d*3 extending in the radial direction, an annular second rim 15*d*4, multiple rod-shaped second ribs 15*d*5 extending in the radial direction, and an annular third rim 15*d*6.

The disk 15*d*1 is formed as a disk-shaped member which extends from the outer peripheral surface of the hub 15*c* to a position beyond the outer periphery of the annular six-axis force sensor 17 toward the radial-direction outer side.

A radial-direction outer part of the six-axis force sensor 17 is attached to the outer periphery of the disk 15*d*1 by multiple first attachment screws 15*f* inserted in the rotation axis a1 direction from the cage 10 side. At this time, the radial-direction central part and the inner periphery of the six-axis force sensor 17 are separated from the disk 15*d*1.

The first rim 15*d*2 is formed as a tubular member which extends in the axial direction from the outer peripheral end of the disk 15*d*1 along the outer peripheral surface of the six-axis force sensor 17. The annular six-axis force sensor 17 is in contact with the first rim 15*d*2 only on the outer peripheral surface of the end on the cage 10 side. Therefore, the axial-direction central part of the six-axis force sensor 17 and the end on the side opposite to the cage 10 are separated from the first rim 15*d*2.

The first ribs 15*d*3 are formed as multiple rod-shaped members which extend radially from the outer peripheral surface of the first rim 15*d*2 toward the radial-direction outer side. Since the first ribs 15*d*3 are formed as rod-shaped members, the inner flange 15*d* has a shape that is lightened in the axial direction between the first rim 15*d*2 and the second rim 15*d*4. The IMU sensor 18 and the transmitter 19 are disposed in the lightened part.

The second rim 15*d*4 is formed as an annular member. The first ribs 15*d*3 are connected to the inner peripheral surface of the second rim 15*d*4, and the second ribs 15*d*5 are connected to the outer peripheral surface of the second rim 15*d*4.

The second ribs 15*d*5 are formed as multiple rod-shaped members which extend radially from the outer peripheral surface of the second rim 15*d*4 toward the radial-direction outer side. Since the second ribs 15*d*5 are formed as rod-shaped members, the inner flange 15*d* has a shape that is lightened in the axial direction between the second rim 15*d*4 and the third rim 15*d*6.

The third rim 15*d*6 is formed as an annular member. The second ribs 15*d*5 are connected to the inner peripheral surface of the third rim 15*d*6, and the tire 15*b* is fitted to the outer peripheral surface of the third rim 15*d*6.

In the wheel 15*a*, the inner flange 15*d* includes the disk-shaped disk 15*d*1, three concentric rims having different diameters (the first rim 15*d*2, the second rim 15*d*4, and the third rim 15*d*6), and multiple rod-shaped ribs (the first ribs 15*d*3 and the second ribs 15*d*5) radially disposed between the rims.

However, the shape of the inner flange 15*d* may be appropriately changed according to the required weight and rigidity. For example, the shapes of the rims and ribs, the number of the ribs and the like may be changed, or they may be formed as a single disk.

Further, in the wheel 15*a*, the six-axis force sensor 17 is attached to the hub 15*c* via the inner flange 15*d*. However, in a case where the six-axis force sensor 17 is directly attached to the hub 15*c* and ribs or rims are directly provided on the outer periphery of the six-axis force sensor 17, the inner flange 15*d* may be omitted.

The outer flange 15*e* is formed as an annular plate member which covers from the vicinity of the outer peripheral surface of the hub 15*c* to the vicinity of the inner peripheral surface of the second rim 15*d*4 of the inner flange 15*d*.

A radial-direction inner part of the six-axis force sensor 17 is attached to the inner periphery of the outer flange 15*e* by multiple second attachment screws 15*g* inserted in the rotation axis a1 direction from the side opposite to the cage 10. At this time, the radial-direction central part and the outer periphery of the six-axis force sensor 17 are separated from the outer flange 15*e*.

An annular body part 16*a* of the hand rim 16 is fixed to the outer periphery of the outer flange 15*e* via multiple columns 16*b* provided upright in the axial direction.

Thus, the six-axis force sensor 17 and the hand rim 16 are connected via the outer flange 15*e*. Therefore, the force (that is, the driving force) applied by the occupant to the hand rim 16 is applied to the six-axis force sensor 17 via the outer flange 15*e*.

In the wheel 15*a*, the outer flange 15*e* is formed as a single plate material. However, the outer flange 15*e* may have any shape as long as it may connect the six-axis force sensor 17 and the hand rim 16, and may be appropriately changed according to the required weight and rigidity.

The six-axis force sensor 17 (multi-axis force detection part) is an annular member having an insertion hole 17*a* formed in the central part. The thickness of the six-axis force sensor 17 is smaller than the axial-direction length of the hub 15*c*. Therefore, the six-axis force sensor 17 is housed inside the wheel 15*a*.

The insertion hole 17*a* is formed as a through hole. The hub 15*c* is inserted into the insertion hole 17*a* from the cage 10 side and is rotatably connected via bearings 17*e*.

Further, the six-axis force sensor 17 is provided with an input part 17*b* on the inner peripheral side, an attachment part 17*c* on the outer peripheral side, and a detection part 17*d* between the input part 17*b* and the attachment part 17*c*.

The input part 17*b* is a part on the radial-direction inner side of the six-axis force sensor 17. The outer flange 15*e* is attached to the surface of the input part 17*b* opposite to the cage 10 side by the multiple second attachment screws 15*g*.

The output part 17*c* is a part on the radial-direction outer side of the six-axis force sensor 17. The attachment part 17*c* is attached to the inner flange 15*d* on the surface on the cage 10 side by the multiple first attachment screws 15*f*.

In this way, in the six-axis force sensor 17, the input part 17*b* to which the outer flange 15*e* for attaching the hand rim 16 is attached is set to the radial-direction inner side of the six-axis force sensor 17, and the attachment part 17*c* for attaching the six-axis force sensor 17 to the inner flange 15*d* is set to the radial-direction outer side of the six-axis force sensor 17.

That is, in the six-axis force sensor 17, the input part 17*b* is provided near the radial-direction center of the wheel 15*a*. In this way, in the six-axis force sensor 17, the influence of the moment of inertia applied to the input part 17*b* is suppressed.

The detection part 17*d* is provided between the input part 17*b* and the attachment part 17*c*. The detection part 17*d* is made of a material having a lower rigidity than the materials of the input part 17*b* and the attachment part 17*c*. The detection part 17*d* is provided with a strain gauge, and the strain gauge is configured to be strained according to the force input to the six-axis force sensor 17. Therefore, in the six-axis force sensor 17, the detection part 17*d* is located at the six-axis force detection position.

As described above, in the six-axis force sensor 17, the input part 17*b* and the attachment part 17*c*, which are the parts used for attachment, are made of a material having sufficiently high rigidity as compared with the detection part 17*d*, which is the part for detection. This prevents the deformation of the input part 17*b* and the attachment part 17*c*, stabilizes the force transmitted to the detection part 17*d*, and improves the detection accuracy.

In the measurement system S1, the six-axis force sensor 17 configured as described above detects, as a six-axis force, a translational force in each of the x-axis, y-axis, and z-axis directions and a moment around each of the x axis, y axis, and z axis when the occupant applies a driving force to the hand rim 16.

Here, in the six-axis force sensor 17, the z axis is set to coincide with the rotation axis a1, and the y axis is set to coincide with the radial direction of the rear wheel 15 (a direction that extends radially about the rotation axis a1), and the x axis is set to be orthogonal to the radial direction.

In the measurement system S1, the strain gauge type sensor is used as the six-axis force sensor 17, but any other type may be used as long as it may detect the translational force and the moment from the applied force. For example, an electrostatic capacitance type six-axis force sensor may be used.

Further, in the measurement system S1, the hand rim 16 is attached to the part on the radial-direction inner side of the six-axis force sensor 17 via the outer flange 15*e* in order to suppress the influence of the moment of inertia. That is, the input part 17*b* is a part on the radial-direction inner side.

However, the attachment position of the outer flange 15*e* is not limited to the part on the radial-direction inner side of the six-axis force sensor 17. For example, the outer flange 15*e* may be attached to a part on the radial-direction outer side of the six-axis force sensor 17 depending on the shapes of other components and the like. That is, the input part 17*b* may be a part on the radial-direction outer side.

The IMU sensor 18 (an acceleration sensor and an angular velocity sensor) is disposed in a lightened part formed by the first rim 15*d*2, the first ribs 15*d*3, and the second rim 15*d*4 of the inner flange 15*d*. As a result, the IMU sensor 18 rotates integrally with the rear wheel 15, the hand rim 16, and the six-axis force sensor 17.

In the measurement system S1, the IMU sensor 18 detects the acceleration in each of the x-axis, y-axis, and z-axis directions and the angular velocity around each of the x axis, y axis, and z axis.

Here, the y axis of the IMU sensor 18 is set to coincide with the radial direction of the rear wheel 15 (the direction that extends radially about the rotation axis a1).

The transmitter 19 is disposed in a lightened part formed by the first rim 15*d*2, the first ribs 15*d*3, and the second rim 15*d*4 of the inner flange 15*d*. The transmitter 19 wirelessly transmits the detection values of the six-axis force sensor 17 and the IMU sensor 18 to a receiver (not shown) of the information terminal.

In addition, in the measurement system S1, the transmitter 19 that wirelessly transmits a signal to the receiver is disposed in the lightened part of the inner flange 15*d*. However, the configuration and position of the transmitter 19 are not limited to the above configuration. For example, a wired transmitter may be used, and its position may be changed as appropriate.

[Configuration of the Information Terminal]

A notebook computer is adopted as the information terminal 2 in the measurement system S1. However, the information terminal 2 is not limited to the notebook computer, and a tablet, a smartphone, or the like may be used.

Further, in a case where the detection values of the sensors are obtained in a wired manner as in the measurement system S2 of the second embodiment (to be described later), the information terminal 2 may be a desktop computer, and in a case where the detection values are obtained via an Internet line or the like, the information terminal 2 may be configured by multiple terminals.

[Configuration of the Processing Part in the System]

Next, the processing part included in the measurement system S1 will be described with reference to FIG. 6.

Figure 6:
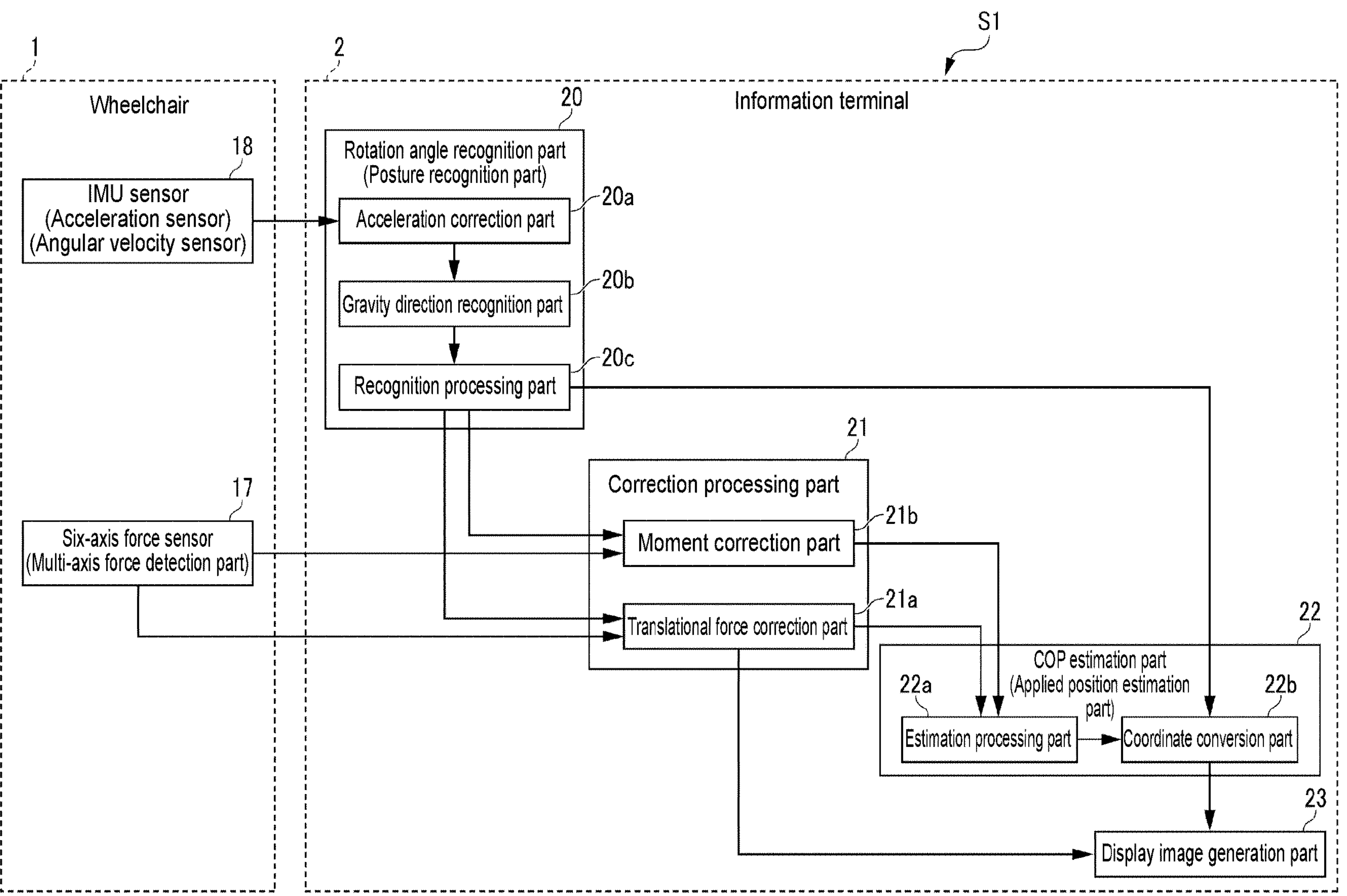
FIG. 6 is a block diagram showing a processing part of the measurement system of FIG.

As shown in FIG. 6, the measurement system S1 includes a rotation angle recognition part 20 (posture recognition part), a correction processing part 21, a center of pressure (COP) estimation part 22 (applied position estimation part), and a display image generation part 23 as a function (processing part) implemented by a hardware configuration or a program installed in the wheelchair 1 and the information terminal 2.

Here, the center of pressure (COP) refers to a point (applied position) that is the center of the applied driving force (pressure) when the occupant applies the driving force to the hand rim 16. In the wheelchair 1, the COP is the applied position. Specifically, a predetermined point in the range of the hand rim 16 held by the occupant's hand is the COP.

The rotation angle recognition part 20 has an acceleration correction part 20*a*, a gravity direction recognition part 20*b*, and a recognition processing part 20*c*.

The acceleration correction part 20*a* recognizes the angular velocity of the IMU sensor 18 around the rotation axis a1 of the rear wheel 15 based on the detection value of the IMU sensor 18. Then, the acceleration correction part 20*a* corrects the acceleration detected by the IMU sensor 18 in the radial direction of the rear wheel 15 based on the recognized angular velocity.

The gravity direction recognition part 20*b* recognizes the gravity direction based on the acceleration corrected by the acceleration correction part 20*a*.

The recognition processing part 20*c* recognizes the vertical direction based on the gravity direction recognized by the gravity direction recognition part 20*b*. Then, the recognition processing part 20*c* recognizes the rotation angle of the six-axis force sensor 17 with reference to the vertical direction.

The correction processing part 21 has a translational force correction part 21*a* and a moment correction part 21*b*.

The translational force correction part 21*a* recognizes the detection value of the six-axis force sensor 17 and corrects the detection value. The correction is performed based on known values including the weight of the input side structure of the hand rim 16 and the outer flange 15*e* and the rotation angle recognized by the rotation angle recognition part 20.

The moment correction part 21*b* recognizes the detection value of the six-axis force sensor 17 and corrects the detection value. The correction is performed based on known values including the weight of the input side structure of the hand rim 16 and the outer flange 15*e*, the distance in the rotation axis a1 direction (z-axis direction) from the focus of the six-axis force sensor 17 to the center of gravity of the input side structure (see FIG. 5), and the rotation angle recognized by the rotation angle recognition part 20.

The COP estimation part 22 has an estimation processing part 22*a* and a coordinate conversion part 22*b*.

The estimation processing part 22*a* estimates the COP in the sensor coordinate system of the six-axis force sensor 17 (hereinafter, this coordinate system is referred to as the "first coordinate system") based on the translational force and the moment corrected by the translational force correction part 21*a* and the moment correction part 21*b* of the correction processing part 21.

The coordinate conversion part 22*b* converts the COP in the first coordinate system estimated by the estimation processing part 22*a* based on the rotation angle recognized by the recognition processing part 20*c* of the rotation angle recognition part 20 into a COP in a coordinate system (hereinafter, this coordinate system is referred to as the "second coordinate system") in which the origin is fixed on the cage 10 or the axle (rotation axis a1) and the direction closest to the vertically upward direction in the radial direction of the rear wheel 15 is set to the upward direction.

The display image generation part 23 generates a display image (see FIG. 16) on a display of the information terminal 2 or the like based on the COP estimated by the COP estimation part 22 and the translational force corrected by the translational force correction part 21*a* of the correction processing part 21.

[Processes Executed by the Processing Part]

Next, processes executed by the measurement system S1 will be described with reference to FIGS. 6 to 16.

[Correction Process of the Centrifugal Force Component]

First, the process executed by the rotation angle recognition part 20 will be described with reference to FIGS. 6 to 8.

In the measurement system S1, the rotation angle of the six-axis force sensor 17 about the rotation axis a1 of the rear wheel 15 is referred to in the translational force correction process, the moment correction process, and the COP estimation process, which will be described later.

Then, in the measurement system S1, the IMU sensor 18 is adopted as a sensor for detecting parameters for recognizing the rotation angle.

Here, in the measurement system S1, the IMU sensor 18 is disposed on the outer peripheral side of the six-axis force sensor 17, that is, at a position away from the rotation axis a1 (see FIGS. 4 and 5). Further, since the measurement system S1 is a system that measures the wheelchair 1 for racing, the rotation speed of the rear wheels 15 is extremely high. Therefore, the detection value of the IMU sensor 18 is a value to which the centrifugal force component is applied.

Therefore, in order to accurately recognize the rotation angle of the six-axis force sensor 17, it is necessary to perform correction to cancel the centrifugal force component applied to the IMU sensor 18 when the process of recognizing the rotation angle is executed.

Further, in the wheelchair 1, the occupant grips and rotates the hand rims 16 to rotate and drive the rear wheels 15. That is, the rotation speed of the rear wheels 15 is not constant, and the centrifugal force component applied to the IMU sensors 18 attached to the rear wheels 15 is not constant, either.

Therefore, the rotation angle recognized based on the detection value of the IMU sensor 18 has to be recognized again each time the process is performed with the rotation angle. Specifically, in the translational force correction process, the moment correction process, and the COP estimation process, which will be described later, when the six-axis force and the COP at each time are recognized, it is necessary to perform the correction described below again at each time to recognize the rotation angle.

Figure 7:
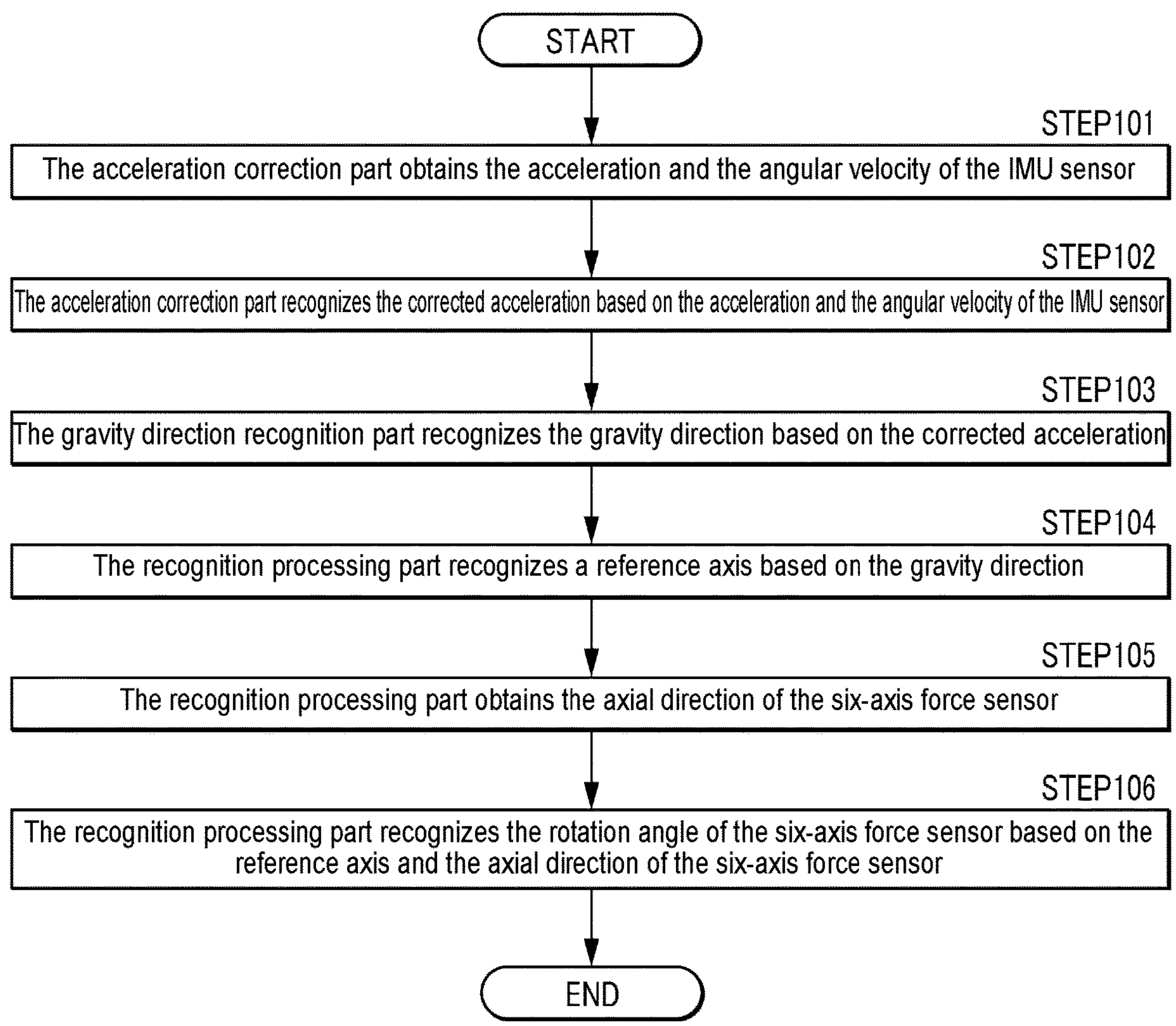
FIG. 7 is a flowchart showing a process executed when the rotation angle of the six-axis force sensor is recognized by using the measurement system of FIG. 1.
Figure 8:
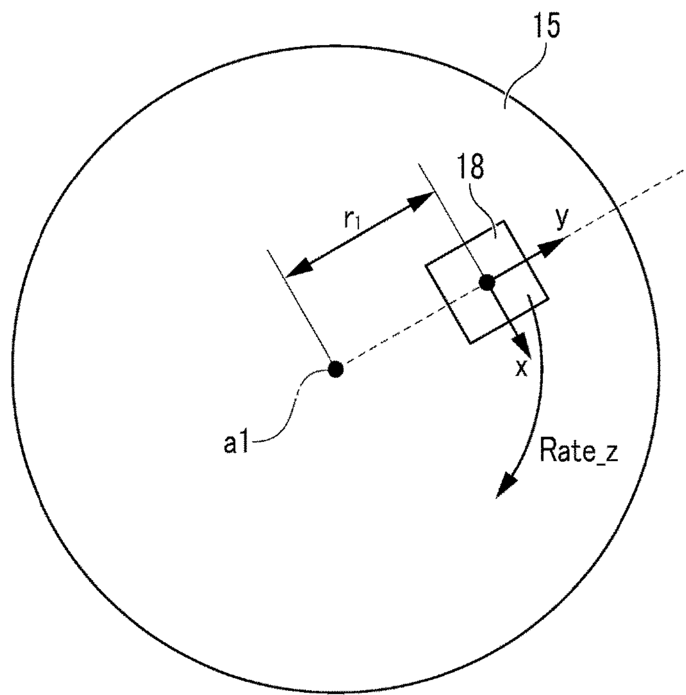
FIG. 8 is an illustration view showing the parameters used when the process of FIG. 7 is executed.

Based on the above, when the rotation angle in the measurement system S1 is recognized, first, the acceleration correction part 20*a* of the rotation angle recognition part 20 obtains, from the IMU sensor 18, the acceleration of the IMU sensor 18 in the y-axis direction of the IMU sensor 18 and the angular velocity of the IMU sensor 18 around the rotation axis a1 of the rear wheel 15 (STEP101 in FIG. 7).

Next, the acceleration correction part 20*a* recognizes the corrected acceleration of the IMU sensor 18 in the y-axis direction based on the obtained acceleration and angular velocity of the IMU sensor 18 (STEP102 in FIG. 7).

Specifically, the acceleration correction part 20*a* recognizes the corrected acceleration based on the following Equation (1).

[Mathematical Equation 1]

$$Acc\_y = Acc\_y\_raw - r \times \mathrm{Rate}\_z^2 \quad (1)$$

Each parameter in the Equation (1) is as follows. In addition, the distance $r_1$ is a known value obtained from the design value.

Acc_y: Corrected acceleration of the IMU sensor 18 in the y-axis direction Acc_y_raw: Detection value of the acceleration of the IMU sensor 18 in the y-axis direction $r_1$: Distance from the rotation axis a1 to the IMU sensor 18

Rate_z: Angular velocity of the IMU sensor 18 around the rotation axis a1

Here, in the measurement system S1, the y axis of the IMU sensor 18 is set to coincide with the radial direction of the rear wheel 15 (the direction that extends radially about the rotation axis a1). Therefore, the x axis and the y axis of the IMU sensor, and the distance $r_1$ and the angular velocity Rate_z of the above parameters are as shown in FIG. 8.

Next, the gravity direction recognition part 20*b* recognizes the gravity direction based on the recognized corrected acceleration (STEP103 in FIG. 7).

Next, the recognition processing part 20*c* recognizes an axis which extends along the recognized gravity direction and which passes through the rotation axis a1 as a reference axis a2 (see FIGS. 10 and 11) (STEP104 in FIG. 7).

Next, the recognition processing part 20*c* recognizes the y-axis direction of the six-axis force sensor 17 (STEP105 in FIG. 7).

Next, the recognition processing part 20*c* recognizes the rotation angle of the six-axis force sensor 17 based on the reference axis a2 and the y-axis direction of the six-axis force sensor 17 (STEP106 in FIG. 7), and the current process ends.

Here, in the measurement system S1, the y axis of the six-axis force sensor 17 is set to coincide with the radial direction of the rear wheel 15 (the direction that extends radially about the rotation axis a1). Therefore, the y-axis rotation angle of the six-axis force sensor 17 with respect to the reference axis a2 at this time becomes the current angle $\theta_t$ of the six-axis force sensor 17 at this time (see FIGS. 10 and 11).

In this way, in the measurement system S1, the radial-direction acceleration of the rear wheel 15 with respect to the IMU sensor 18 is corrected based on the angular velocity (and thus the centrifugal force component) of the IMU sensor 18 around the rotation axis a1. As a result, it is possible to accurately recognize the gravity direction recognized based on the y-axis direction, and thus it is possible to accurately recognize the rotation angle of the six-axis force sensor 17 recognized based on the gravity direction.

In addition, for example, in a case where the IMU sensor 18 is disposed at a position that substantially coincides with the center of the six-axis force sensor 17, or in a case where the rotation speed of the rear wheel 15 (and thus the IMU sensor 18 attached to the rear wheel 15) is very low, the centrifugal force component applied to the IMU sensor 18 may be ignored.

That is, in these cases, the rotation angle of the six-axis force sensor 17 may be recognized by using the detection value of the IMU sensor 18 as it is. Therefore, in such cases, the acceleration correction part 20*a* may be omitted.

Further, in a case where the rotation angle of the six-axis force sensor 17 is recognized by motion capture without using the IMU sensor 18, as in the measurement system S2 of the second embodiment (to be described later), as a matter of course, it is not necessary to consider the centrifugal force component applied to the IMU sensor 18. Therefore, in this case as well, the acceleration correction part 20*a* may be omitted.

[Correction Process of the Translational Force and the Moment]

Next, a process executed by the correction processing part 21 for the translational force and the moment detected by the six-axis force sensor 17 will be described with reference to FIGS. 5, 6 and 9 to 12.

In the measurement system S1, the translational force and the moment in each of the x-axis, y-axis, and z-axis directions of the six-axis force sensor 17 are referred to in the COP estimation process described later. Here, the translational force and the moment detected by the six-axis force sensor 17 are mainly based on the driving force applied to the hand rim 16 by the occupant.

However, the translational force and the moment detected by the six-axis force sensor 17 are not only based on the driving force applied by the occupant, but are also based on the weight of the structure on the input side of the detection position of the six-axis force sensor 17 of the wheelchair 1 (hereinafter also referred to as the "input side structure").

Further, in the wheelchair 1 of the measurement system S1, as shown in FIG. 5, this weight is the sum of the weights of each of the hand rim 16, the outer flange 15*e*, the input part 17*b* of the six-axis force sensor 17, and the part of the detection part 17*d* on the input part 17*b* side. This weight is a known value obtained from the design value.

Therefore, in order to accurately recognize the translational force and the moment based on the driving force applied by the occupant, it is necessary to perform correction to cancel the influence of the weight of the input side structure on the translational force and the moment detected by the six-axis force sensor 17.

Figure 9:
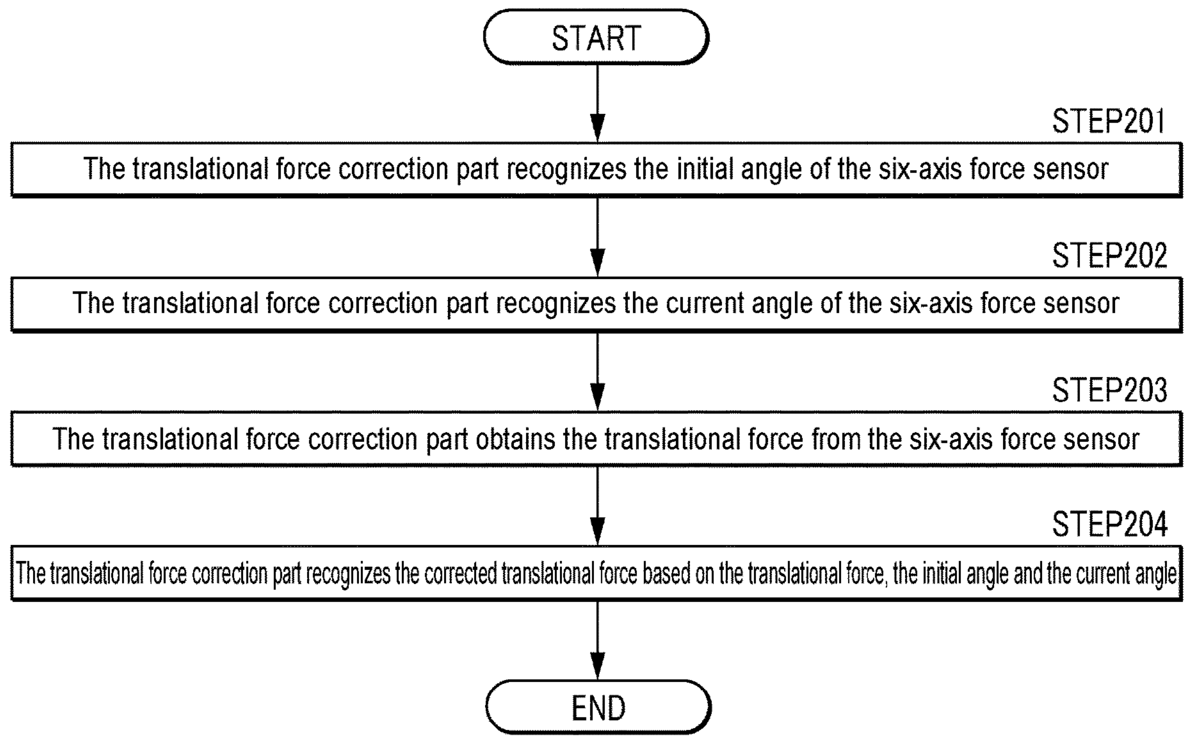
FIG. 9 is a flowchart showing a process executed when the translational force detected by the six-axis force sensor is corrected by using the measurement system of FIG. 1.

Based on the above, when the translational force is recognized in the measurement system S1, first, the translational force correction part 21*a* of the correction processing part 21 recognizes the initial angle of the six-axis force sensor 17 (STEP201 in FIG. 9).

Here, in the measurement system S1, the y axis of the six-axis force sensor 17 is set to coincide with the radial direction of the rear wheel 15 (the direction that extends radially about the rotation axis a1). Therefore, the y-axis angle of the six-axis force sensor 17 with respect to the reference axis a2 recognized by the rotation angle recognition part 20 becomes the rotation angle of the six-axis force sensor 17.

Figure 10:
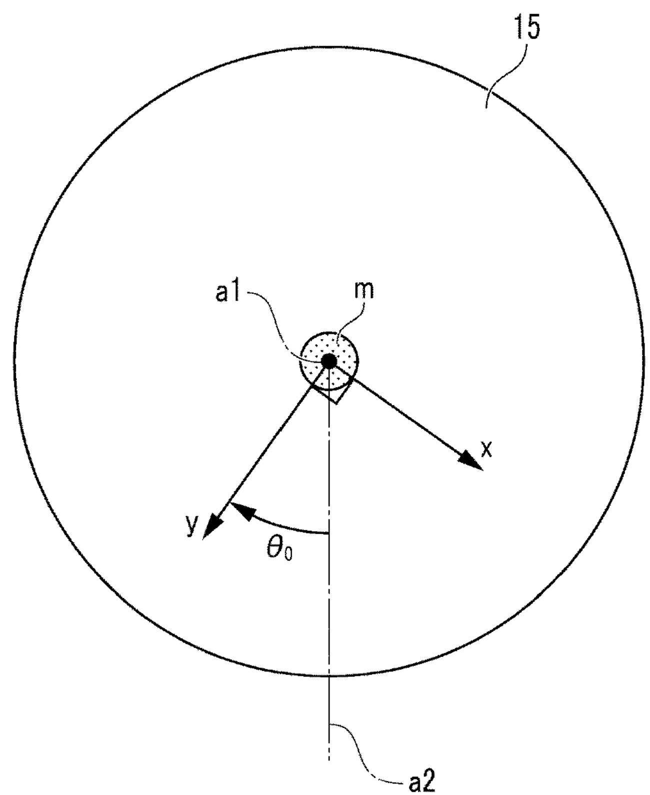
FIG. 10 is an illustration view showing the parameters used when the process of FIG. 9 is executed, and is a view showing a state at a time point when zero reset is performed.

Then, as shown in FIG. 10, in the measurement system S1, the rotation angle of the six-axis force sensor 17 at a time point when the measurement is started (that is, before the rear wheel 15 starts rotating) is the initial angle $\theta_0$.

Next, the translational force correction part 21*a* recognizes the current angle of the six-axis force sensor 17 at a time point when a predetermined time has elapsed after the start of measurement (STEP202 in FIG. 9).

Figure 11:
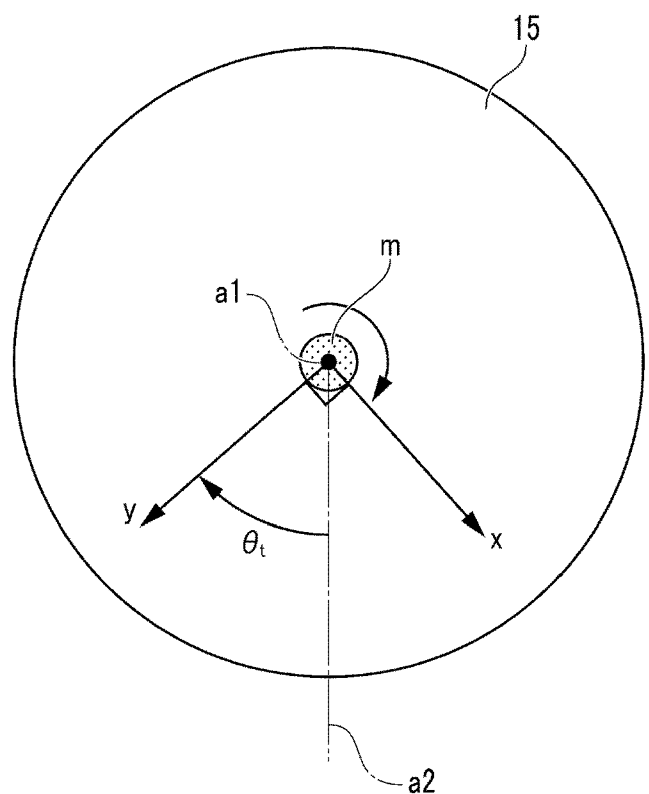
FIG. 11 is an illustration view showing the parameters used when the process of FIG. 9 is executed, and is a view showing a state at a time point when a predetermined time has elapsed from the time point when the zero reset is performed.

As shown in FIG. 11, in the measurement system S1, the rotation angle of the six-axis force sensor 17 at a time point t when a predetermined time has elapsed from the start of measurement is the current angle $\theta_t$. The current angle $\theta_t$ is recognized by the same method as the initial angle $\theta_0$.

Next, the translational force correction part 21*a* obtains the translational force in each of the x-axis, y-axis, and z-axis directions detected by the six-axis force sensor 17 from the six-axis force sensor 17 (STEP203 in FIG. 9).

Next, the translational force correction part 21*a* recognizes the corrected translational force based on the obtained translational force and the recognized initial angle and current angle (STEP204 in FIG. 9), and the current process ends.

Specifically, the translational force correction part 21*a* recognizes the corrected translational force in the x-axis direction based on the following Equation (2).

[Mathematical Equation 2]

$$Fx = Fx\_raw + mg(-\sin\theta_t + \sin\theta_0) \tag{2}$$

Each parameter in the Equation (2) is as follows. The weight m is a known value obtained from the design value.

Fx: Corrected translational force of the six-axis force sensor 17 in the x-axis direction Fx raw: Detection value of the translational force of the six-axis force sensor 17 in the x-axis direction m: Sum of the weight of the input side structure $\theta_t$: Current angle of the six-axis force sensor 17

$\theta_0$: Initial angle of the six-axis force sensor 17

Further, the translational force correction part 21*a* recognizes the corrected translational force in the y-axis direction based on the following Equation (3).

[Mathematical Equation 3]

$$Fy = Fy\_raw + mg(-\cos\theta_t + \cos\theta_0) \tag{3}$$

Each parameter in the Equation (3) is as follows. The weight m is a known value obtained from the design value.

Fy: Corrected translational force of the six-axis force sensor 17 in the y-axis direction Fy_raw: Detection value of the translational force of the six-axis force sensor 17 in the y-axis direction m: Sum of the weight of the input side structure $\theta_t$: Current angle of the six-axis force sensor 17

$\theta_0$: Initial angle of the six-axis force sensor 17

Further, as shown in FIG. 5, in the measurement system S1, the focus f of the six-axis force sensor 17 and the center of gravity g of the input side structure are both located on the rotation axis a1 (z axis). That is, the influence of the translational force in the z-axis direction due to the weight of the input side structure is zero or negligibly small. Therefore, the measurement system S1 does not perform the process of correcting the translational force in the z-axis direction due to the weight of the input side structure.

Figure 12:
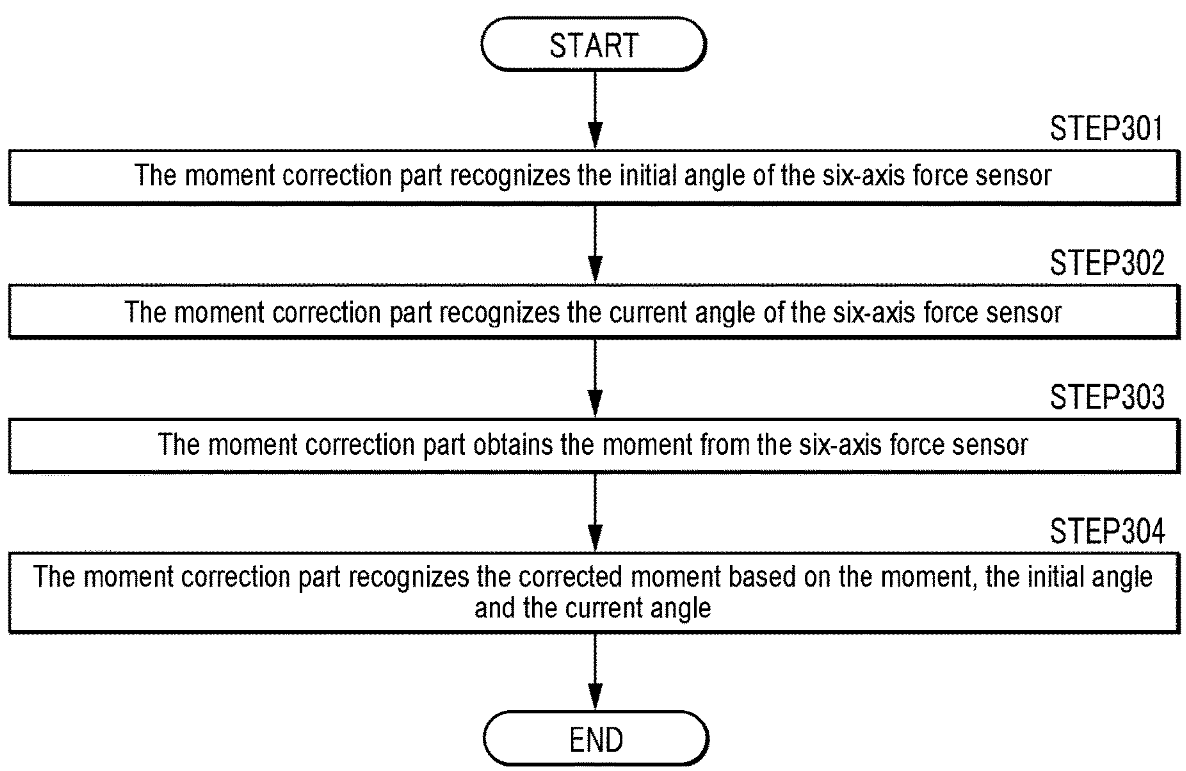
FIG. 12 is a flowchart showing a process executed when the moment detected by the six-axis force sensor is corrected by using the measurement system of FIG. 1.

Next, when the moment is recognized in the measurement system S1, first, the moment correction part 21*b* of the correction processing part 21 recognizes the initial angle of the six-axis force sensor 17 (STEP301 in FIG. 12).

Next, the moment correction part 21*b* recognizes the current angle of the six-axis force sensor 17 at a time point when a predetermined time has elapsed after the start of measurement (STEP302 in FIG. 12).

In addition, the recognition of the initial angle and the current angle in this process is performed by the same method as the recognition of the initial angle and the current angle in the translational force correction process.

Next, the moment correction part 21*b* obtains the moment in each of the x-axis, y-axis, and z-axis directions detected by the six-axis force sensor 17 from the six-axis force sensor 17 (STEP303 in FIG. 12).

Next, the moment correction part 21*b* recognizes the corrected moment based on the obtained moment and the recognized initial angle and current angle (STEP304 in FIG. 12), and the current process ends.

Specifically, the moment correction part 21*b* recognizes the corrected moment in the x-axis direction based on the following Equation (4).

[Mathematical Equation 4]

$$Mx = Mx\_\mathrm{raw} + mgl(-\cos\theta_t + \cos\theta_t + \cos\theta_0) \quad (4)$$

Each parameter in the Equation (4) is as follows. The weight m and the distance 1 are known values obtained from the design values.

Mx: Corrected moment of the six-axis force sensor 17 in the x-axis direction Mx_raw: Detection value of the moment of the six-axis force sensor 17 in the x-axis direction m: Sum of the weight of the input side structure g: Gravitational acceleration l: Distance from the focus of the six-axis force sensor 17 to the center of gravity of the input side structure $\theta_t$: Current angle of the six-axis force sensor 17

$\theta_0$: Initial angle of the six-axis force sensor 17

In addition, the moment correction part 21*b* recognizes the corrected moment in the y-axis direction based on the following Equation (5).

[Mathematical Equation 5]

$$My = My\_\mathrm{raw} + mgl(-\sin\theta_t + \sin\theta_0) \quad (5)$$

Each parameter in the Equation (5) is as follows. The weight m and the distance l are known values obtained from the design values.

My: Corrected moment of the six-axis force sensor 17 in the y-axis direction My raw: Detection value of the moment of the six-axis force sensor 17 in the y-axis direction m: Sum of the weight of the input side structure g: Gravitational acceleration l: Distance from the focus of the six-axis force sensor 17 to the center of gravity of the input side structure $\theta_t$: Current angle of the six-axis force sensor 17

$\theta_0$: Initial angle of the six-axis force sensor 17

Further, as shown in FIG. 5, in the measurement system S1, the focus f of the six-axis force sensor 17 and the center of gravity g of the input side structure are both located on the rotation axis a1 (z axis). That is, the direction of the distance 1, which is the distance from the focus f to the center of gravity g, coincides with the z-axis direction. Therefore, the moment in the z-axis direction due to the input side structure is zero or negligibly small. Therefore, the measurement system S1 does not perform the process of correcting the moment in the z-axis direction due to the weight of the input side structure.

As described above, in the measurement system S1, the detection values from the six-axis force sensor 17 are corrected based on the weight of the input side structure. As a result, the translational force and the moment based on the driving force applied by the occupant may be accurately recognized.

Further, in a case where the weight of the input side structure is negligibly small, the detection values of the six-axis force sensor 17 may be directly used as the translational force and the moment based on the driving force applied by the occupant as they are without correcting the translational force and the moment detected by the six-axis force sensor 17.

Further, in the measurement system S1, the weight of the input side structure is a known value obtained from the design value. However, when the value is unknown, for example, the rear wheel 15 may be rotated once, and a change in the translational force in the x-axis direction or the y-axis direction during the rotation may be recorded, and the translational force due to the weight of the input side structure may be calculated based on the amplitude of the value of the change.

[COP Estimation Process]

Next, a process executed by the COP estimation part 22 and the display image generation part 23 for the COP related to the driving force applied to the hand rim 16 by the occupant will be described with reference to FIGS. 6 and 13 to 16.

Further, in the following description, when expressing a vector, "↑" is added in front of a symbol or a reference numeral indicating what is expressed as a vector.

The measurement system S1 recognizes the translational force based on the driving force applied to the hand rim 16 by the occupant. Then, the force may be recognized as a vector based on the driving force applied to the hand rim 16 by the occupant by using the translational force.

Incidentally, in the measurement system S1, the translational force is recognized by the detection value of the six-axis force sensor 17 and the detection value of the IMU sensor 18. However, the position of the starting point of the vector (that is, the COP) cannot be directly specified by these detection values.

Specifically, the vector is based on the driving force applied to the hand rim 16 by the occupant, and since the hand rim 16 is an annular member, the starting point of the vector in the rotation axis a1 direction (that is, the z-axis direction) can be estimated to be the position that coincides with the hand rim 16. On the other hand, the starting point in the x-axis direction and the y-axis direction cannot be specified.

Therefore, in the measurement system S1, based on the recognized translational force and moment based on the driving force applied to the hand rim 16 by the occupant, and based on the rotation angle of the six-axis force sensor 17 at that time point, an estimation process (applied position estimation method) is performed to determine the x-axis position and the y-axis position of the COP (that is, an estimated angle $\theta_c$ described later) which is the starting point of the vector. Further, the measurement system S1 also executes a process of generating a display image based on the translational force and the COP obtained in this way.

Figure 13:
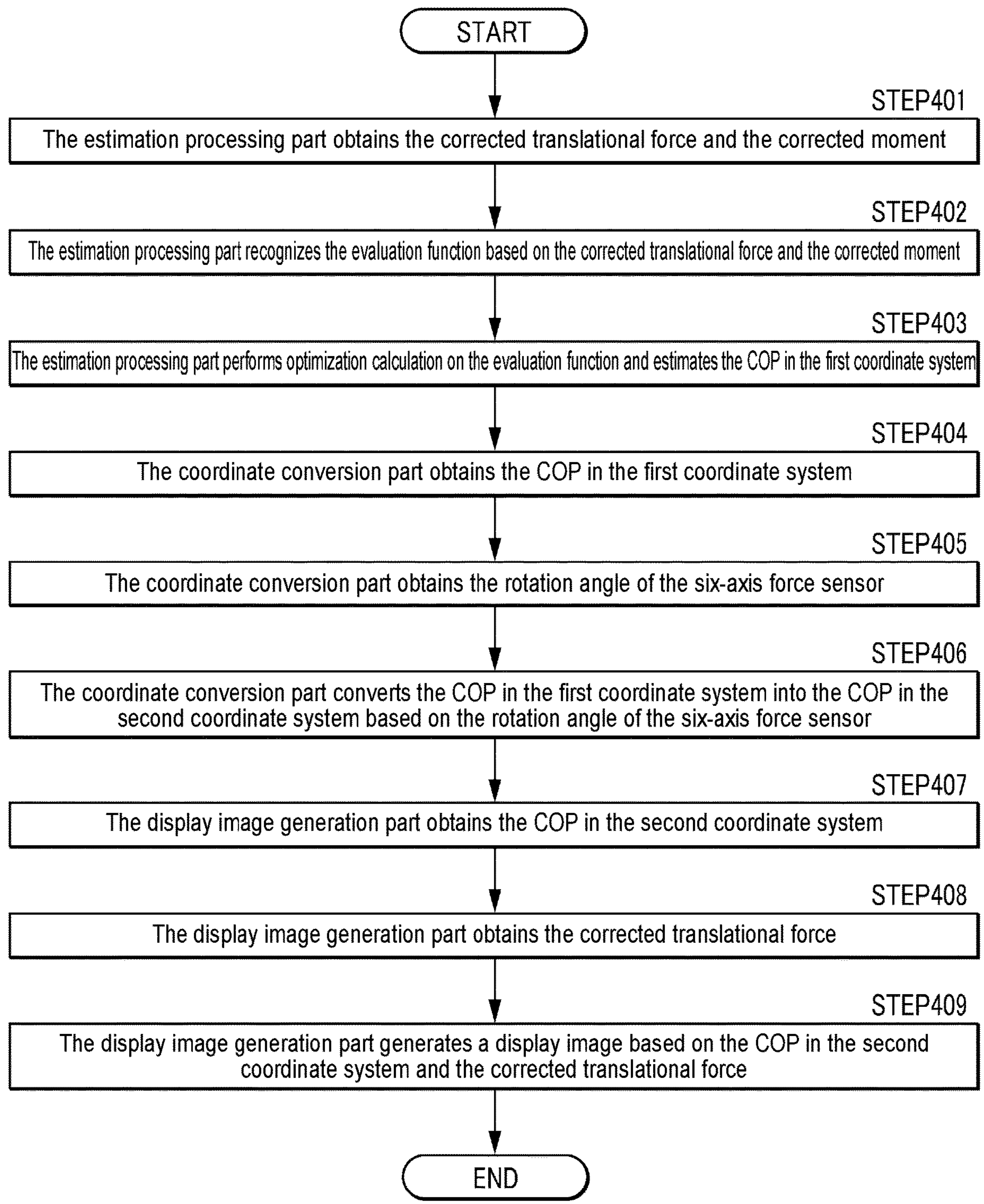
FIG. 13 is a flowchart showing a process executed when the COP is estimated by using the measurement system of FIG. 1.

When these processes are executed, first, the estimation processing part 22*a* of the COP estimation part 22 obtains the corrected translational force and the corrected moment from the translational force correction part 21*a* and the moment correction part 21*b* of the correction processing part 21 (STEP401 in FIG. 13).

Next, the estimation processing part 22*a* recognizes the evaluation function based on the corrected translational force and the corrected moment (STEP402 in FIG. 13).

Specifically, the estimation processing part 22*a* recognizes the evaluation function in the following procedure. First, the following Equation (6) is established between the COP and the translational force and the moment obtained based on the detection values of the six-axis force sensor 17.

[Mathematical Equation 6]

$$\uparrow M \approx \uparrow COP \times \uparrow F = \uparrow M' \tag{6}$$

Each parameter in the Equation (6) is as follows.

↑M: Moment based on the detection value of the six-axis force sensor 17

↑COP: Position vector whose starting point is the focus f (see FIG. 5) of the six-axis force sensor 17 on the rotation axis a1 and whose ending point is the COP ↑F: Translational force based on the detection value of the six-axis force sensor 17

↑M': Value of the moment around the focus f of the six-axis force sensor 17 estimated from the COP and the corrected translational force When ↑M in the Equation (6) is expressed as a component in each of the x-axis, y-axis, and z-axis directions of the six-axis force sensor 17, the following Equation (7) is obtained.

[Mathematial Equation 7]

$$\uparrow M = \begin{pmatrix} Mx \\ My \\ Mz \end{pmatrix} \tag{7}$$

Further, when ↑COP and ↑F in the Equation (6) are expressed as components in each of the x-axis, y-axis, and z-axis directions of the six-axis force sensor 17, the following Equation (8) is obtained.

[Mathematical Equation 8]

$$\uparrow M' = \begin{pmatrix} COPx \\ COPy \\ COPz \end{pmatrix} \times \begin{pmatrix} Fx \\ Fy \\ Fz \end{pmatrix} \tag{8}$$

From these Equations (6) to (8), the following Equation (9) is obtained.

[Mathematical Equation 9]

$$\begin{pmatrix} Mx \\ Mv \\ Mz \end{pmatrix} \approx \begin{pmatrix} COPx \\ COPy \\ COPz \end{pmatrix} \times \begin{pmatrix} Fx \\ Fy \\ Fz \end{pmatrix} \tag{9}$$

Figure 14:
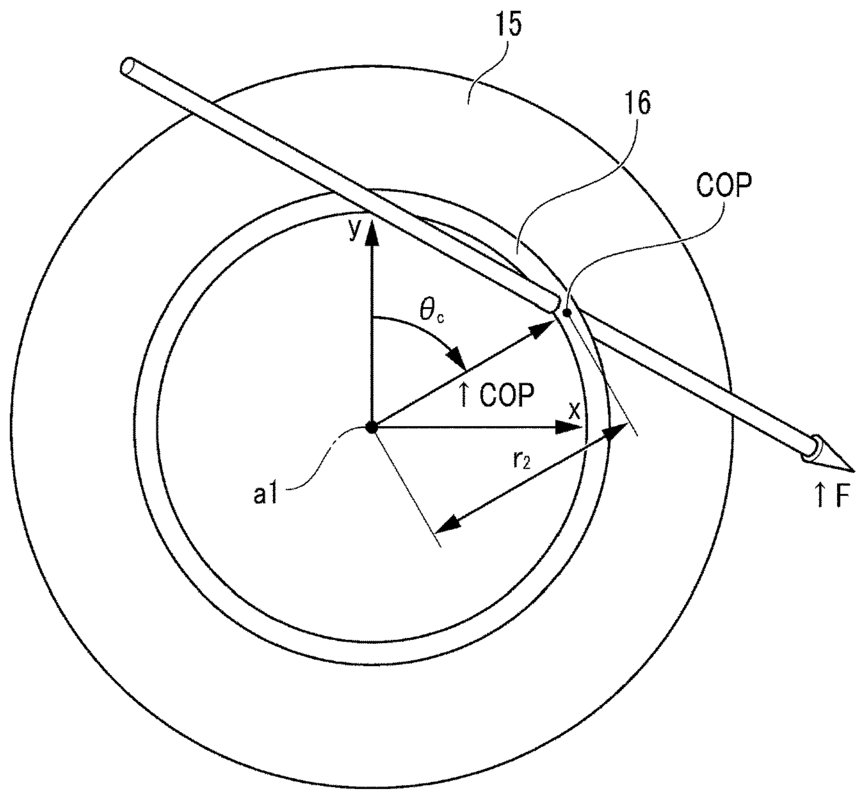
FIG. 14 is an illustration view showing the parameters used when the process of FIG. 13 is executed.

Here, as shown in FIG. 14, when the distance from the rotation axis a1 to the hand rim 16 is a distance $r_2$, and the distance from the focus of the six-axis force sensor 17 to a plane where the hand rim 16 is located is a distance $r_3$, and the angle between the y axis and ↑COP in the first coordinate system (which is the sensor coordinate system of the six-axis force sensor 17) is the estimated angle $\theta_c$, then ↑COP may be expressed by the following Equation (10).

Further, the distance $r_2$ and the distance $r_3$ are known values obtained from the design values.

[Mathematical Equation 10]

$$\uparrow COP = \begin{pmatrix} COPx \\ COPy \\ COPz \end{pmatrix} = \begin{pmatrix} r_2 \cdot \sin\theta_c \\ r_2 \cdot \cos\theta_c \\ r_3 \end{pmatrix} \tag{10}$$

Therefore, from the Equations (9) and (10), the Equation (6) may be expressed as the following Equation (11).

[Mathematical Equation 11]

$$\uparrow M = \begin{pmatrix} Mx \\ My \\ Mz \end{pmatrix} \approx \begin{pmatrix} r_2 \cdot \sin\theta_c \\ r_2 \cdot \cos\theta_c \\ r_3 \end{pmatrix} \times \begin{pmatrix} Fx \\ Fy \\ Fz \end{pmatrix} = \uparrow M' \tag{11}$$

Here, in the parameters included in the Equation (11), the translational forces Fx, Fy and Fz and the moments Mx, My and Mz are obtained based on the detection values of the six-axis force sensor 17, and $r_2$ and $r_3$ are known values. Therefore, in the parameters included in the Equation (11), only the estimated angle $\theta_c$ and ↑M' based on the estimated angle $\theta_c$ are unknown values.

Therefore, in the measurement system S1, the function of the estimated angle $\theta_c$ based on the Equation (11) is used as the evaluation function. Specifically, the following Equation (12) is used as the evaluation function.

[Mathematical Equation 12]

$$f(\theta_c) = |\uparrow M - \uparrow M'| \tag{12}$$

Next, the estimation processing part 22*a* performs optimization calculation on the evaluation function and estimates the COP in the first coordinate system based on the result (STEP403 in FIG. 13).

Specifically, the estimation processing part 22*a* calculates the evaluation function $f(\theta_c)$ by changing the estimated angle $\theta_c$ once and obtains the estimated angle $\theta_c$ having the smallest calculated value. Then, the COP in the first coordinate system is estimated based on the estimated angle $\theta_c$. The optimization calculation method used at this time is not limited to such a method, and another known method may be used.

Further, the evaluation function is not limited to a function that expresses an error between the moment detected by the six-axis force sensor 17 and the moment estimated from the translational force detected by the six-axis force sensor 17, as in the Equation (12).

Figure 15:
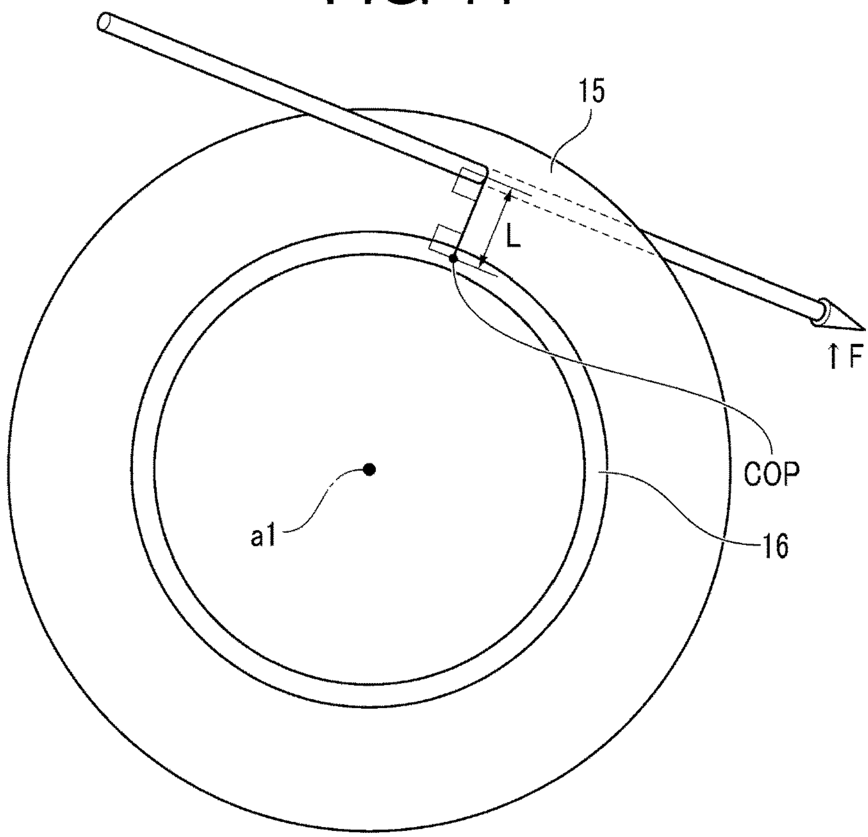
FIG. 15 is an illustration view showing the parameters used for an evaluation function in the measurement system according to a modified example.

For example, as shown in FIG. 15, the position of ↑F with respect to the hand rim 16 (that is, the distance L in the space from the hand rim 16 to the line segment representing ↑F) may be determined from the value of ↑M. Therefore, a function related to the distance L obtained from ↑M may be adopted as an evaluation function, and the position on the hand rim 16 where the distance L becomes the smallest is calculated from the evaluation function, and the position may be estimated as the COP.

Next, the coordinate conversion part 22*b* of the COP estimation part 22 obtains the COP in the first coordinate system from the estimation processing part 22*a* (STEP404 in FIG. 13).

Next, the coordinate conversion part 22*b* obtains, from the rotation angle recognition part 20, the rotation angle of the six-axis force sensor 17 at the time point when the detection of the six-axis force sensor 17 is performed (STEP405 in FIG. 13).

Next, the coordinate conversion part 22*b* converts the COP in the first coordinate system into the COP in the second coordinate system based on the rotation angle of the six-axis force sensor 17 (STEP406 in FIG. 13).

Specifically, in the measurement system S1, the sensor coordinate system of the six-axis force sensor 17 is the first coordinate system, and the coordinate system in which the origin is fixed on the cage 10 or the axle (rotation axis a1) and the direction closest to the vertically upward direction in the radial direction of the rear wheel 15 is set to the upward direction is the second coordinate system. Therefore, the coordinate conversion part 22*b* recognizes the COP in the second coordinate system by rotating the COP in the first coordinate system around the rotation axis a1.

Further, the method for converting the COP in the first coordinate system into the COP in the second coordinate system is not limited to the above method and may be set as appropriate according to the types of the defined first coordinate system and second coordinate system.

Next, the display image generation part 23 obtains the COP in the second coordinate system from the coordinate conversion part 22*b* of the COP estimation part 22 (STEP407 in FIG. 13).

Next, the display image generation part 23 obtains the corrected translational force from the translational force correction part 21*a* of the correction processing part 21 (STEP408 in FIG. 13).

Next, the display image generation part 23 generates a display image based on the COP in the second coordinate system and the corrected translational force (STEP409 in FIG. 13), and the current process ends.

Figure 16:
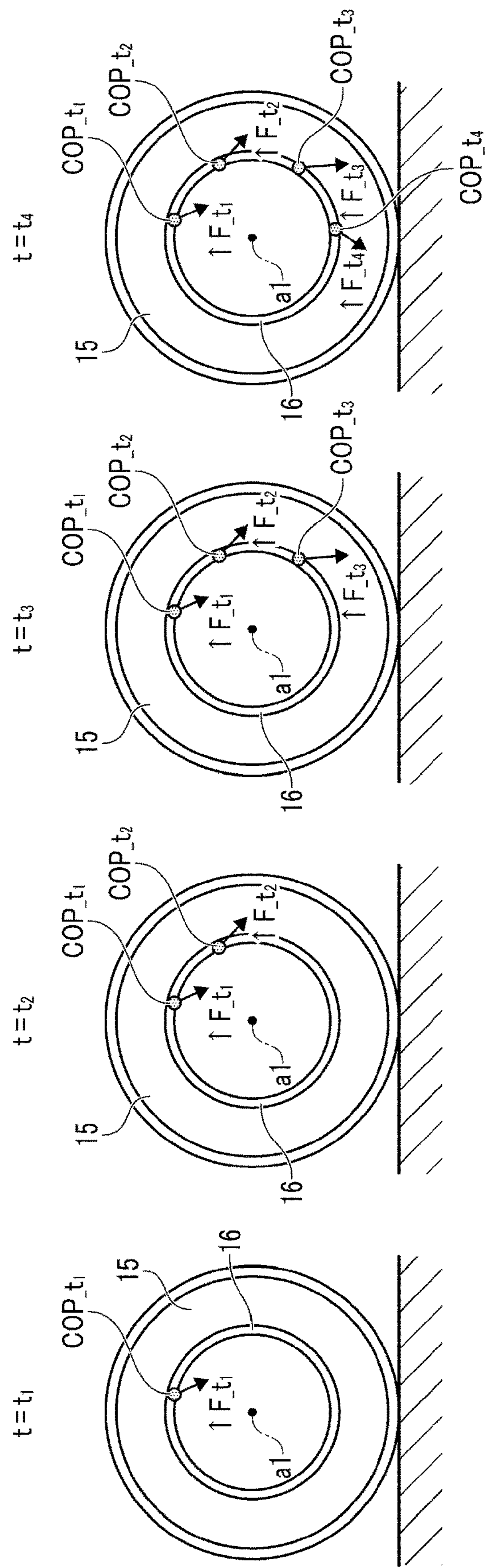
FIG. 16 is a schematic view showing an example of a display form of measurement results by the measurement system of FIG. 1.

Specifically, as shown in the leftmost image of FIG. 16, in an image of the rear wheel 15 viewed from the axis a1 direction, the display image generation part 23 plots $COP\_t_1$ in the second coordinate system at the estimated time point (e.g., time $t_1$) on the hand rim 16 in the image.

Further, the display image generation part 23 recognizes $↑F\_t_1$ as a vector based on the components of the corrected translational force at the time $t_1$ in the x-axis direction and the y-axis direction. Then, $↑F\_t_1$ is displayed as an arrow starting from $COP\_t_1$. At this time, the component of the corrected translational force in the z-axis direction may be expressed by, for example, displaying a circle corresponding to the magnitude of the component in $COP\_t_1$, or may be expressed by changing the thickness of $↑F\_t_1$ according to the magnitude of the component.

Further, the measurement system S1 is configured to generate display images at multiple time points (e.g., $t_1$, $t_2$, $t_3$, and $t_4$), and to superimpose and display the display images each time they are generated.

Specifically, as the time advances to $t_1$, $t_2$, $t_3$, and $t_4$, the display image changes from the image on the left side to the image on the right side in FIG. 16, and the COP and ↑F at each time point are superimposed and displayed.

Further, the display image is not limited to the one shown in FIG. 16, and the display form may be changed as appropriate. Further, the estimated COP is not necessarily shown as a display image and may be treated as numerical data.

As described above, in the measurement system S1, the COP of the driving force from the occupant to the hand rim 16 is estimated based on the translational force and the moment detected by the six-axis force sensor 17 and the rotation angle recognized by the rotation angle recognition part 20.

Here, the translational force, the moment, and the rotation angle are common parameters and may be detected relatively accurately without using special equipment. Therefore, according to the measurement system S1, the COP of the driving force from the occupant to the hand rim 16 may be accurately estimated without using special equipment.

Further, in the measurement system S1, the six-axis force sensor 17 is adopted as the sensor for detecting the translational force and the moment, and the IMU sensor 18 is adopted as the sensor for recognizing the rotation angle.

The six-axis force sensor and the IMU sensor are commonly used sensors, and there are light-weight and small-sized ones. Therefore, these sensors may be mounted on the wheelchair itself. Further, since the detection values by the six-axis force sensor and the IMU sensor are direct numerical values, it is not necessary to perform complicated processes such as image processing in order to perform the process for estimating the COP. As a result, a large processing device is not required.

Therefore, in the measurement system S1, the system may be configured simply by the wheelchair 1 itself equipped with these sensors and the information terminal 2. As a result, according to the measurement system S1, for example, it is possible to perform measurement while the wheelchair 1 is actually run, regardless of the location.

Second Embodiment

Hereinafter, the measurement system S2 according to the second embodiment will be described with reference to FIGS. 17 to 19.

In addition, the measurement system S2 of the embodiment recognizes the rotation angle of the six-axis force sensor 17 based on images obtained by cameras 32 to be described later (that is, by what is called motion capture) instead of based on the detection value of the IMU sensor. Except for this, the measurement system S2 has the same configuration as that of the measurement system S1 of the first embodiment. Therefore, in the following description, the same or corresponding components will be denoted by the same reference numerals, and detailed description thereof will be omitted.

Figure 17:
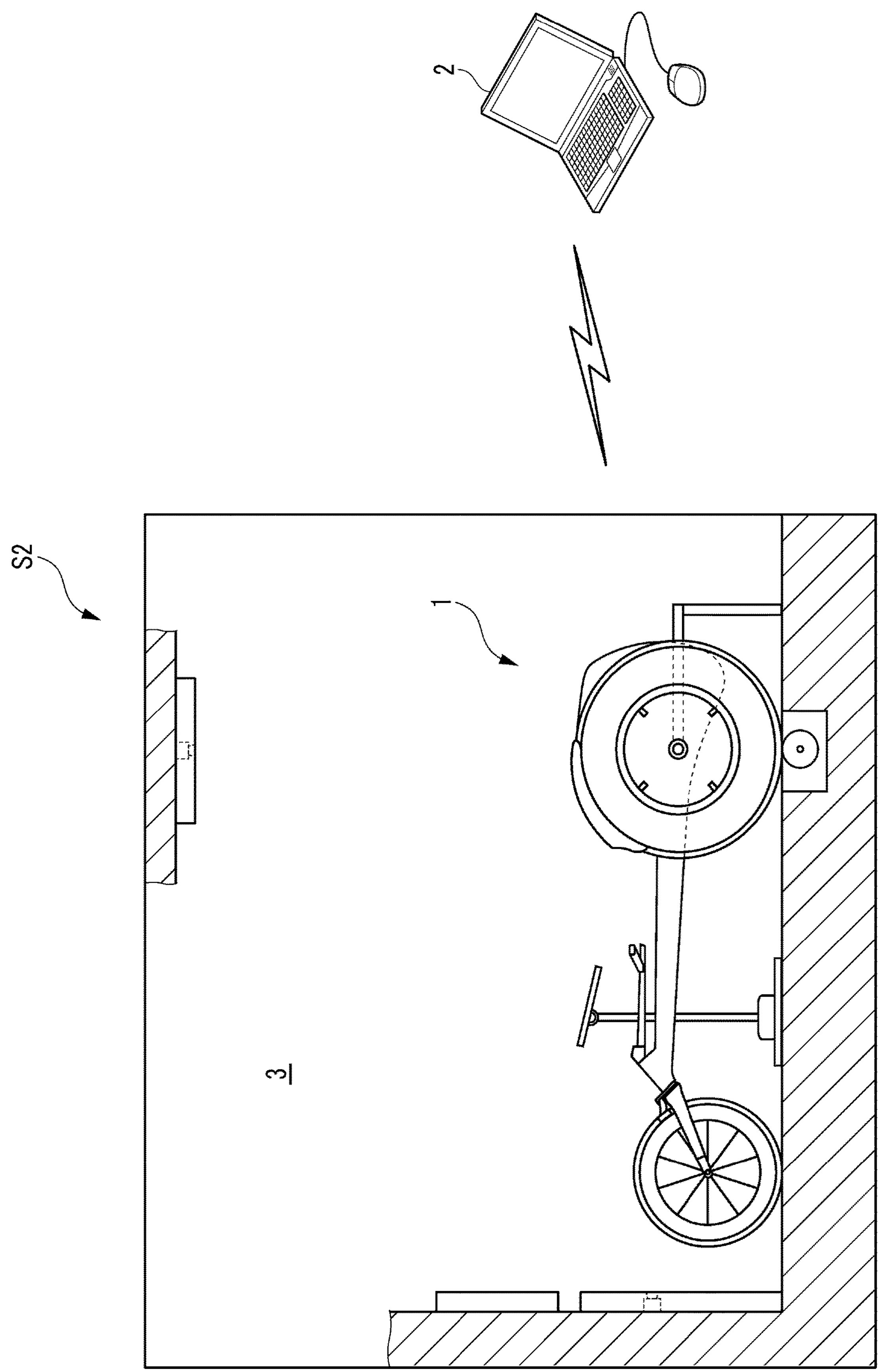
FIG. 17 is an illustration view showing a schematic configuration of the measurement system according to the second embodiment.

As shown in FIG. 17, the measurement system S2 includes the wheelchair 1 which has sensors, the information terminal 2 which obtains detection values from the sensors and performs analysis processes based on the obtained detection values, and a measurement room 3 which houses the wheelchair 1 for measuring the operation of the wheelchair 1 and the occupant on the wheelchair 1.

Figure 18:
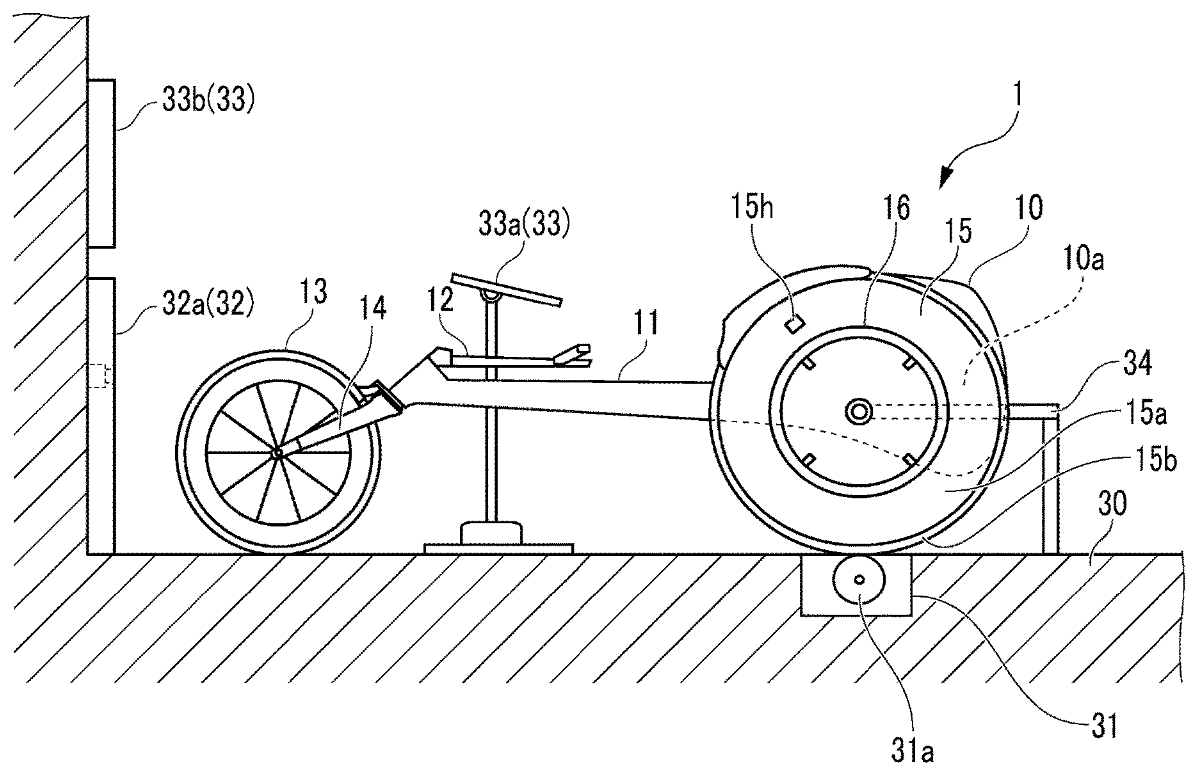
FIG. 18 is a side view showing the structure around the wheelchair of the measurement system of FIG. 17.
Figure 19:
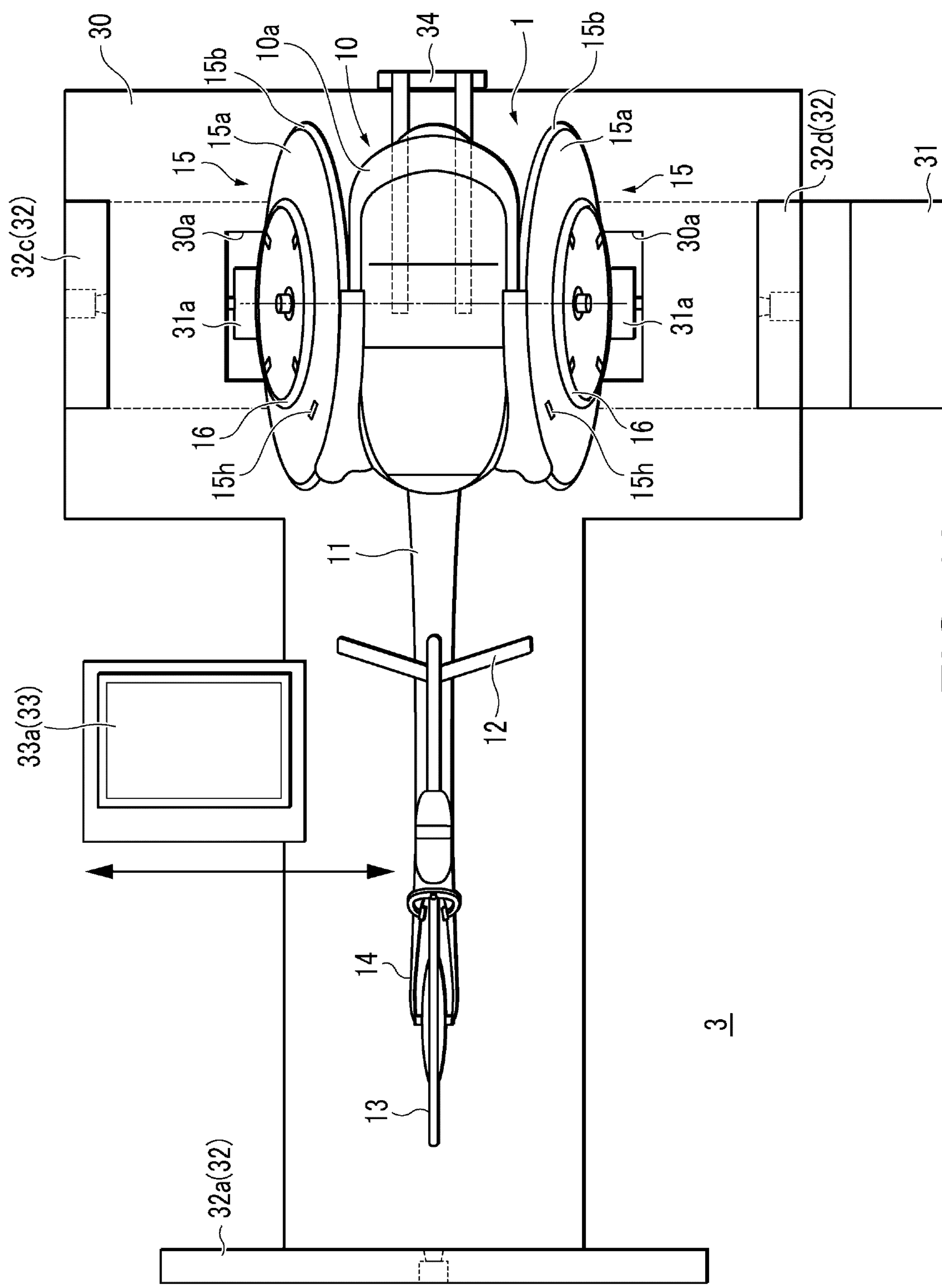
FIG. 19 is a plan view showing the structure around the wheelchair of the measurement system of FIG. 17.

As shown in FIGS. 18 and 19, the measurement system S2 includes a housing 30 on which the wheelchair 1 is placed, an ergometer 31 built in the housing 30, four cameras 32 which photograph the state of the rear wheels 15 and the posture of the occupant on the wheelchair 1, two monitors 33 which are display devices for allowing the occupant to recognize data such as measurement results, and a fixing member 34 for fixing the position of the wheelchair 1.

The ergometer 31 is disposed in a position below the placement position of the wheelchair 1 to be fitted into the housing 30 of the measurement system S2. The ergometer 31 includes a pair of rollers 31*a*, a motor (not shown) which rotates the rollers 31*a*, and a torque meter (not shown).

Each of the pair of rollers 31*a* is exposed from openings 30*a* provided on the upper surface of the housing 30, and is in contact with each of the rear wheels 15 of the wheelchair 1. The rollers 31*a* rotate with the rotation of the rear wheels 15 in contact therewith. The rotation state (that is, torque, rotation speed, and the like) of the rollers 31*a* is detected by the torque meter and transmitted to the information terminal 2.

The driving of the rollers 31*a* is controlled by the motor. The output torque of the motor is controlled according to a command from the information terminal 2. For example, the output torque of the motor is controlled to generate in simulation a running resistance according to the actual running on the rear wheels 15 in contact with the rollers 31*a*. As a result, the ergometer 31 may apply the same load as in actual running to the rear wheels 15, and thus to the arms of the occupant.

In addition, in the ergometer 31 of the measurement system S2, a pair of rollers 31*a* are provided to contact each of the rear wheels 15. However, it is also possible to provide only one roller for a pair of rear wheels 15 as long as the roller 31*a* may apply a load to the rear wheels 15.

The cameras 32 include a first camera 32*a* for photographing the occupant from the front, a second camera 32*b* for photographing the occupant from above, a third camera 32*c* for photographing the occupant and the rear wheel 15 from the right side, and a fourth camera 32*d* for photographing the occupant and the rear wheel 15 from the left side.

In the measurement system S2, the cameras 32 photograph the occupant, who has attached signs to various parts of the body, and the rear wheels 15, to which indicators 15*h* are attached, and the positions of the occupant's neck, shoulders, waist and elbows and the rotation angle of the rear wheels 15 (and thus the rotation angle of the six-axis force sensors 17) at each time are calculated based on the photographed moving image or the continuously photographed still images.

The monitors 33 include a first monitor 33*a* which may be slid and moved to a position below the occupant's face during operation and a second monitor 33*b* fixed to the front side of the wheelchair 1.

The first monitor 33*a* and the second monitor 33*b* display the setting of the ergometer 31 and the measurement status of the torque and rotation speed of the rollers of the ergometer 31 as well as the detected posture of the occupant, the driving force calculated by the information terminal 2, the joint torque and muscle strength of the occupant, the COP, and the like. The occupant on the wheelchair 1 confirms the information via the monitors 33.

The fixing member 34 is fixed to the rear of the housing 30 and is connected to the cage 10 of the wheelchair 1 from the rear. As a result, the fixing member 34 fixes the cage 10 (and thus the position of the wheelchair 1) to the housing 30.

Further, the fixing member 34 may be any member that may fix the wheelchair 1 in a state where the rear wheels 15 may be driven. Therefore, for example, the fixing member 34 may fix the vehicle frame 11.

The measurement system S2 configured in this way may also achieve the same effects as the measurement system S1 of the first embodiment.

Other Embodiments

Although the embodiments of the drawings have been described above, the disclosure is not limited to the above embodiments.

For example, in the above embodiments, the rotation angle of the six-axis force sensor 17 is adopted as the posture of the six-axis force sensor 17 which is the multi-axis force detection part. This is because the focus f of the six-axis force sensor 17 is fixed to be located on the rotation axis a1 of the rear wheel 15. Therefore, when the rear wheel 15 and the hand rim 16 rotate, only the rotation angle changes as the posture of the six-axis force sensor 17.

However, the posture of the multi-axis force detection part in the disclosure is not limited to the change of the rotation angle, and may be anything that changes according to the rotation of the driving wheel and the hand rim. For example, when the position of the multi-axis force detection part changes according to the rotation, the position with respect to the rotation axis may be included as an element indicating the posture.

Further, in the above embodiments, the six-axis force sensor 17 is adopted as the multi-axis force sensor. However, the multi-axis force sensor of the disclosure is not limited to the six-axis force sensor, and may be anything that may detect a translational force in each of the x-axis, y-axis, and z-axis directions and a moment around each of the x axis, y axis, and z axis when the occupant applies a driving force to the hand rim. Therefore, the multi-axis force detection part may be configured by multiple sensors.

Further, in the above embodiments, the IMU sensor 18 is adopted as the acceleration sensor and the angular velocity sensor.

However, the acceleration sensor of the disclosure is not limited to the above configuration and may be anything that rotates integrally with the driving wheel, the hand rim, and the multi-axis force detection part. Further, the angular velocity sensor of the disclosure is not limited to the above configuration and may be anything that recognizes the angular velocity of the acceleration sensor around the axis of the driving wheel.

Here, the acceleration sensor may be anything that may detect acceleration in two axial directions orthogonal to the rotation axis. Further, the angular velocity sensor may be anything that detects the angular velocity of the acceleration sensor around the rotation axis. Therefore, the angular velocity sensor may be provided separately from the acceleration sensor and is not necessarily mounted on the wheelchair.

Further, in the above embodiments, by using the optimization calculation, the sensor coordinate system of the six-axis force sensor 17 is set to the first coordinate system, and the coordinate system in which the origin is fixed on the cage 10 or the axle (rotation axis a1) and the direction closest to the vertically upward direction in the radial direction of the rear wheel 15 is set to the upward direction is set to the second coordinate system. Then, the COP in the first coordinate system is obtained, and the coordinate system of this COP is converted to obtain the COP in the second coordinate system.

This is for estimating the COP by a relatively simple process by using the optimization calculation. In addition, by recognizing the COP in the second coordinate system, the image displayed thereafter may be easily understood.

However, the driving force applied position estimation device of the disclosure is not limited to the above configuration, and may be anything that estimates the driving force applied position based on the translational force and the moment and the posture of the multi-axis force detection part that detects them. Therefore, for example, the COP may be estimated by another method instead of the optimization calculation, or the coordinate system may not be converted.

Moreover, in the above embodiments, the measurement systems S1 and S2 are configured as a system in which the wheelchair 1 is incorporated. In this way, the measurement may be performed in an environment close to the actual running situation.

However, the driving force applied position estimation system of the disclosure is not limited to the above configuration. For example, the system may be configured by incorporating a member including only a cage, a driving wheel, and a hand rim instead of the wheelchair itself.

What is claimed is:

1. A driving force applied position estimation system comprising a cage for an occupant to sit, a driving wheel rotatably attached to the cage, and a hand rim provided on the driving wheel, the driving force applied position estimation system comprising:

a multi-axis force detection part which is provided between the driving wheel and the hand rim and which detects a translational force and a moment related to application of a driving force from the hand rim side;

a posture recognition part which recognizes a posture of the multi-axis force detection part that changes according to rotation of the driving wheel and the hand rim; and an applied position estimation part which estimates an applied position of the driving force from the occupant to the hand rim, wherein the applied position estimation part estimates the applied position based on the translational force and the moment detected by the multi-axis force detection part and based on the posture recognized by the posture recognition part.

2. The driving force applied position estimation system according to claim 1, wherein the multi-axis force detection part rotates integrally with the driving wheel and the hand rim, the posture recognition part is a rotation angle recognition part which recognizes a rotation angle of the multi-axis force detection part around a rotation axis of the driving wheel, and the applied position estimation part estimates the applied position based on the translational force and the moment detected by the multi-axis force detection part and based on the rotation angle recognized by the rotation angle recognition part.

3. The driving force applied position estimation system according to claim 2, further comprising:

an acceleration sensor which rotates integrally with the driving wheel, the hand rim, and the multi-axis force detection part; and an angular velocity sensor which recognizes an angular velocity of the acceleration sensor around an axis of the driving wheel, wherein the multi-axis force detection part is a six-axis force sensor, and the rotation angle recognition part recognizes the rotation angle based on a detection value of the acceleration sensor and a detection value of the angular velocity sensor.

4. The driving force applied position estimation system according to claim 3, wherein the rotation angle recognition part comprises:

an acceleration correction part which corrects the acceleration detected by the acceleration sensor in a radial direction of the driving wheel based on the angular velocity of the acceleration sensor around the axis of the driving wheel;

a gravity direction recognition part which recognizes a gravity direction based on the corrected acceleration; and a recognition processing part which recognizes the rotation angle based on the recognized gravity direction.

5. The driving force applied position estimation system according to claim 4, further comprising:

a translational force correction part which corrects the translational force detected by the multi-axis force detection part, wherein when a structure on an input side with respect to a detection position in the multi-axis force detection part is an input side structure, the translational force correction part corrects the translational force detected by the multi-axis force detection part based on a weight of the input side structure and the rotation angle, and the applied position estimation part estimates the applied position based on the translational force corrected by the translational force correction part, the moment detected by the multi-axis force detection part, and the rotation angle.

6. The driving force applied position estimation system according to claim 4, further comprising:

a moment correction part which corrects the moment detected by the multi-axis force detection part, wherein when a structure on an input side with respect to a detection position in the multi-axis force detection part is an input side structure, the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

7. The driving force applied position estimation system according to claim 3, further comprising:

a translational force correction part which corrects the translational force detected by the multi-axis force detection part, wherein when a structure on an input side with respect to a detection position in the multi-axis force detection part is an input side structure, the translational force correction part corrects the translational force detected by the multi-axis force detection part based on a weight of the input side structure and the rotation angle, and the applied position estimation part estimates the applied position based on the translational force corrected by the translational force correction part, the moment detected by the multi-axis force detection part, and the rotation angle.

8. The driving force applied position estimation system according to claim 7, further comprising:

a moment correction part which corrects the moment detected by the multi-axis force detection part, wherein the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

9. The driving force applied position estimation system according to claim 3, further comprising:

a moment correction part which corrects the moment detected by the multi-axis force detection part, wherein when a structure on an input side with respect to a detection position in the multi-axis force detection part is an input side structure, the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

10. The driving force applied position estimation system according to claim 3, wherein the applied position estimation part generates an evaluation function based on the translational force and the moment detected by the multi-axis force detection part and estimates the applied position based on a result of optimization calculation for the evaluation function and the rotation angle recognized by the rotation angle recognition part.

11. The driving force applied position estimation system according to claim 2, further comprising:

an acceleration sensor which rotates integrally with the driving wheel, the hand rim, and the multi-axis force detection part; and an angular velocity sensor which recognizes an angular velocity of the acceleration sensor around an axis of the driving wheel, wherein the rotation angle recognition part comprises:

an acceleration correction part which corrects the acceleration detected by the acceleration sensor in a radial direction of the driving wheel based on the angular velocity of the acceleration sensor around the axis of the driving wheel;

a gravity direction recognition part which recognizes a gravity direction based on the corrected acceleration; and a recognition processing part which recognizes the rotation angle based on the recognized gravity direction.

12. The driving force applied position estimation system according to claim 11, further comprising:

a translational force correction part which corrects the translational force detected by the multi-axis force detection part, wherein when a structure on an input side with respect to a detection position in the multi-axis force detection part is an input side structure, the translational force correction part corrects the translational force detected by the multi-axis force detection part based on a weight of the input side structure and the rotation angle, and the applied position estimation part estimates the applied position based on the translational force corrected by the translational force correction part, the moment detected by the multi-axis force detection part, and the rotation angle.

13. The driving force applied position estimation system according to claim 11, further comprising:

a moment correction part which corrects the moment detected by the multi-axis force detection part, wherein when a structure on an input side with respect to a detection position in the multi-axis force detection part is an input side structure, the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

14. The driving force applied position estimation system according to claim 11, wherein the applied position estimation part generates an evaluation function based on the translational force and the moment detected by the multi-axis force detection part and estimates the applied position based on a result of optimization calculation for the evaluation function and the rotation angle recognized by the rotation angle recognition part.

15. The driving force applied position estimation system according to claim 2, further comprising:

a translational force correction part which corrects the translational force detected by the multi-axis force detection part, wherein when a structure on an input side with respect to a detection position in the multi-axis force detection part is an input side structure, the translational force correction part corrects the translational force detected by the multi-axis force detection part based on a weight of the input side structure and the rotation angle, and the applied position estimation part estimates the applied position based on the translational force corrected by the translational force correction part, the moment detected by the multi-axis force detection part, and the rotation angle.

16. The driving force applied position estimation system according to claim 15, further comprising:

a moment correction part which corrects the moment detected by the multi-axis force detection part, wherein the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

17. The driving force applied position estimation system according to claim 2, further comprising:

a moment correction part which corrects the moment detected by the multi-axis force detection part, wherein when a structure on an input side with respect to a detection position in the multi-axis force detection part is an input side structure, the moment correction part corrects the moment detected by the multi-axis force detection part based on a weight of the input side structure and the rotation angle, and the applied position estimation part estimates the applied position based on the translational force detected by the multi-axis force detection part, the moment corrected by the moment correction part, and the rotation angle.

18. The driving force applied position estimation system according to claim 2, wherein the applied position estimation part generates an evaluation function based on the translational force and the moment detected by the multi-axis force detection part and estimates the applied position based on a result of optimization calculation for the evaluation function and the rotation angle recognized by the rotation angle recognition part.

19. The driving force applied position estimation system according to claim 1, further comprising:

a wheelchair having the cage, the driving wheel, and the hand rim.

20. A driving force applied position estimation method comprising a cage for an occupant to sit, a driving wheel rotatably attached to the cage, and a hand rim provided on the driving wheel for estimating an applied position of a driving force from the occupant to the hand rim, the driving force applied position estimation method comprising:

detecting, by a multi-axis force detection part which is provided between the driving wheel and the hand rim and whose posture changes according to rotation of the driving wheel and the hand rim, a translational force and a moment related to application of the driving force from the hand rim side;

recognizing, by a posture recognition part, the posture of the multi-axis force detection part; and estimating, by an applied position estimation part, the applied position based on the translational force and the moment detected by the multi-axis force detection part and based on the posture recognized by the posture recognition part.

* * * * *